United States Patent [19]

Yusa et al.

[11] Patent Number: 5,270,438
[45] Date of Patent: Dec. 14, 1993

[54] FLUORINE-CONTAINING POLYIMIDES AND PRECURSORS THEREOF

[75] Inventors: Masami Yusa, Shimodate; Shinji Takeda; Yasuo Miyadera, both of Tsukuba, all of Japan

[73] Assignee: Hitachi Chemical Company, Ltd., Tokyo, Japan

[21] Appl. No.: 679,940

[22] Filed: Apr. 3, 1991

[30] Foreign Application Priority Data

Apr. 3, 1990 [JP] Japan .................................. 2-88490
May 29, 1990 [JP] Japan .................................. 2-139030
Jun. 20, 1990 [JP] Japan .................................. 2-162491

[51] Int. Cl.$^5$ ...................... C08G 69/26; C08G 73/10; C08G 8/02
[52] U.S. Cl. ................................. 528/353; 528/125; 528/126; 528/128; 528/170; 528/171; 528/172; 528/173; 528/174; 528/185; 528/188; 528/220; 528/229; 528/350
[58] Field of Search ............... 528/125, 126, 128, 170, 528/171, 174, 172, 173, 185, 188, 229, 220, 350, 353

[56] References Cited

U.S. PATENT DOCUMENTS 4,111,906 9/1978 Jones et al. .......................... 528/185
4,965,339 10/1990 Maruyama ........................... 528/353

FOREIGN PATENT DOCUMENTS 63-305108 12/1988 Japan .
1-140121 1/1989 Japan .
1-108260 4/1989 Japan .
1-287111 11/1989 Japan .
2-164854 6/1990 Japan .
2-164859 6/1990 Japan .
2-290847 11/1990 Japan .
2051507 2/1991 Japan .
3-174446 7/1991 Japan .

OTHER PUBLICATIONS

Journal of Polymer Science: Part A: Polymer Chemistry, vol. 28, 1990, pp. 323-331 T. Ichino et al. "Synthesis and Properties of New Polyimides Containing Fluorinated Alkoxy Side Chains".

*Primary Examiner*—John Kight, III
*Assistant Examiner*—P. Hampton-Hightower
*Attorney, Agent, or Firm*—Antonelli, Terry, Stout & Kraus

[57] ABSTRACT

A fluorine-containing polyimide having a low dielectric constant, low water absorption and excellent heat resistance and moisture resistance and a precursor thereof such as a fluorine-containing polyamide-acid, can be prepared by reacting an acid anhydride with an aromatic diamine having perfluoroalkyl group.

20 Claims, 14 Drawing Sheets

FLUORINE-CONTAINING POLYIMIDES AND PRECURSORS THEREOF

BACKGROUND OF THE INVENTION

This invention relates to fluorine-containing polyimides, fluorine-containing polyamide-acids, a process for preparing polyimides or precursors thereof, fluorine-containing aromatic diamine compounds, a process for preparing such diamine compound, fluorine-containing diurethane compounds and a process for preparing such diurethane compounds.

Generally, polyimide resins are produced by reacting tetracarboxylic acid dianhydrides and diamines. Owing to their excellent heat resistance, polyimide resins are finding a wide scope of use ranging from materials for electronic devices to aerospace engineering materials. Recently, in practical use of polyimide resins, especially as material for electronic devices, request is rising for the improvement of moisture resistance and low dielectric constant in addition to high heat resistance of said resins, so as to coordinate with the recent tendency toward higher density and higher performance of the electronic devices.

Regarding polyimides, Japanese Patent Publication Nos. 43-1876 and 60-500109 disclose the polyimides obtained by using an acid dianhydride having the following structural formula:

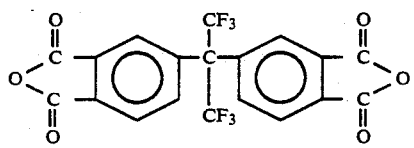

Such polyimides, however, are incapable of meeting the above requirements to a satisfactory degree.

As an example of aromatic diamines, Japanese Pat. Appln. Kokai No. 1-190562 offers an aromatic diamine represented by the formula:

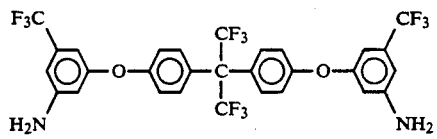

This aromatic diamine, however, is low in fluorine content since fluorine is contained only in the form of trifluoromethyl group. Therefore, when a polyimide is produced by reacting this aromatic diamine with a tetracarboxylic acid dianhydride, it is certain that the obtained polyimide will fail to measure up to the above-described property requirements.

Also, Japanese Patent Application Kokai (Laid-Open) No. H1-180860 discloses an aromatic diamine represented by the following formula:

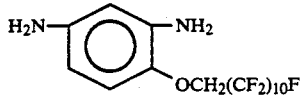

and a polyimide obtained by reacting said aromatic diamine with a tetracarboxylic acid dianhydride. However said aromatic diamine is liable to breakage of bonding on heating because of the presence of methylene group of hydrocarbons with weak intermolecular bonding strength between the benzene ring and the perfluoroalkyl group. Therefore, the polyimide obtained by using said aromatic diamine is poor in heat resistance.

SUMMARY OF THE INVENTION

The present inventors found that in order to meet the requirements described above, it is necessary to introduce a greater number of fluorine atoms into the polyimide molecular structure and to contrive an appropriate way for such introduction and, motivated by this finding, produced novel fluorine-containing polyimides and precursors of the polyimides such as fluorine-containing polyamide-acids. Also, the present inventors succeeded in obtaining the novel fluorine-containing aromatic diamines that can be used as starting material of said novel compound, and further produced the novel fluorine-containing aromatic diurethane compounds that can serve as an intermediate for the sysnthesis of said diamines.

The present invention provides a fluorine-containing polyimide having repeating units of the following formula:

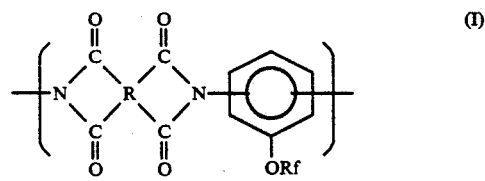

wherein R represents a tetravalent residue of tetracarboxylic acid dianhydride; and Rf represents $-C_nF_{2n-1}$ (wherein n is an integer of 6-12), which contains one double bond and may be branched properly, and wherein hydrogen in the benzene ring may be optionally substituted with an appropriate substituent.

As examples of the substituent that can be bonded to said benzene ring, there can be cited a lower alkyl group, a lower alkoxyl group, fluorine, chlorine and bromine.

Said fluorone-containing polyimide may further contain repeating units of the following formula:

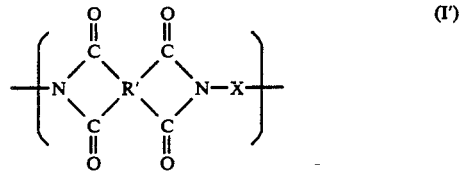

wherein R' represents a tetravalent residue of tetracarboxylic acid dianhydride; and X represents a divalent residue of diamine exclusive of the group represented by

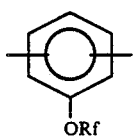

in the formula (I), wherein hydrogen in the benzene ring may be optionally substituted with an appropriate substituent such as a lower alkyl group, a lower alkoxyl group, fluorine, chlorine, bromine or the like.

The fluorine-containing polyamide-acid of the present invention has repeating units represented by the following formula:

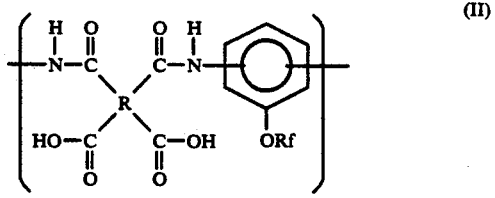

(II)

wherein R and Rf represent the same as defined above with reference to the formula (I), and hydrogen in the benzene ring may be optionally substituted with an appropriate substituent.

Examples of the substituent that can be bonded to the benzene ring include a lower alkyl group, a lower alkoxyl group, fluorine, chlorine and bromine.

Said fluorine-containing polyamide-acid may further contain repeating units of the following formula:

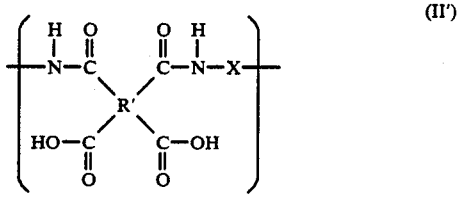

(II')

wherein R' and X are as defined above with reference to the formula (I').

DESCRIPTION OF THE PREFERRED EMBODIMENTS

Figure 1:
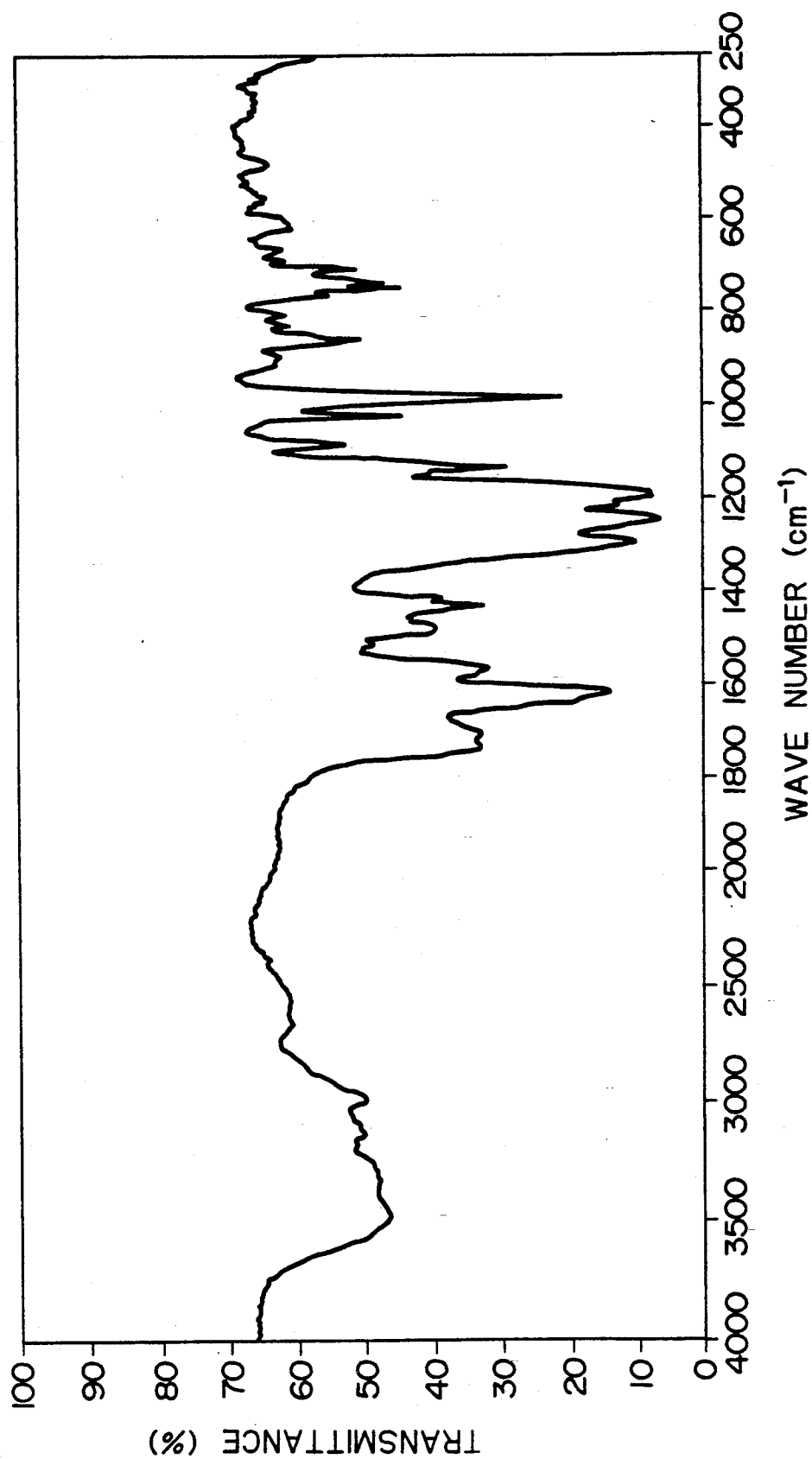
FIG. 1 is an IR spectrum of the polyamide-acid obtained in Example 3.

The fluorine-containing polyimides of the present invention comprise the repeating units of the following formula:

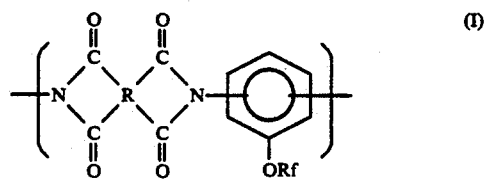

(I)

wherein R represents a tetravalent residue of tetracarboxylic acid dianhydride; and Rf represents $-C_nF_{2n-1}$ (wherein n is an integer of 6–12), which contains one double bond and may be branched appropriately, and wherein hydrogen in the benzene ring may be optionally substituted with an appropriate substituent. If necessary, said polyimides may further contain repeating units of the following formula:

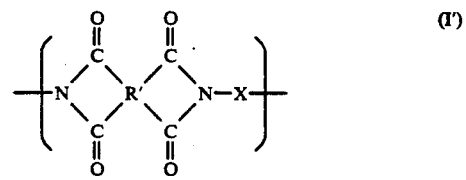

(I')

wherein R' represents a tetravalent residue of tetracarboxylic acid dianhydride, and X represents a divalent residue of diamine exclusive of the group represented by

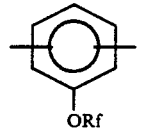

(wherein hydrogen in the benzene ring may be substituted with an appropriate substituent).

The fluorine-containing polyimides of the present invention preferably comprise the repeating units of the formula (I) and the repeating units of the formula (I') in a molar ratio of the latter/the former of 0/100 to 95/5, more preferably 0/100 to 90/10. Also, the fluorine-containing polyamide-acids of this invention preferably comprise the repeating units of the formula (II) and the repeating units of the formula (II') in a molar ratio of the latter/the former of 0/100 to 95/5, more preferably 0/100 to 90/10. Said fluorine-containing polyimides in which the ratio of the repeating units of the formula (I) is low or the polyimides obtained from said fluorine-containing polyamide-acids in which the ratio of the repeating units of the formula (II) is low tend to prove low in moisture resistance and high in dielectric constant.

The precursor of said polyimides include said polyamide-acids and resins obtained by partially imidizing said polyamide-acids.

Said polyimides or the precursors thereof can be produced by reacting (a) a tetracarboxylic acid dianhydride and (b) a diamine compound containing a fluorine-containing diamine compound represented by the formula:

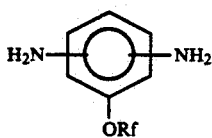

wherein Rf is as defined above with reference to the formula (I); hydrogen in the benzene ring may be substituted with an appropriate substituent such as a lower alkyl group, a lower alkoxyl group, fluorine, chlorine, bromine or the like; and two amino groups are bonded to the aromatic ring at the ortho-, meta- or para-position in relation to the ether linkage. Said fluorine-containing polyimides can be also produced by subjecting said fluorine-containing polyamide-acids to a dehydration ring-closing reaction (imidization).

The tetracarboxylic acid dianhydrides usable in the above reaction include the following: pyromellitic acid dianhydride,
3,3',4,4'-diphenyltetracarboxylic acid dianhydride,
2,2',3,3'-diphenyltetracarboxylic acid dianhydride,
2,2-bis(3,4-dicarboxyphenyl)propane dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
3,4,9,10-perillenetetracarboxylic acid dianhydride,
bis(3,4-dicarboxyphenyl)ether dianhydride,
benzene-1,2,3,4-tetracarboxylic acid dianhydride,
3,4,3',4'-benzophenonetetracarboxylic acid dianhydride,
2,3,2',3-benzophenonetetracarboxylic acid dianhydride,
2,3,3',4'-benzophenonetetracarboxylic acid dianhydride,
1,2,5,6-naphthalenetetracarboxylic acid dianhydride,
2,3,6,7-naphthalenetetracarboxylic acid dianhydride,
1,2,4,5-naphthalenetetracarboxylic acid dianhydride,
1,4,5,8-naphthalenetetracarboxylic acid dianhydride,
2,6-dichloronaphthalene-1,4,5,8-tetracarboxylic acid dianhydride,
2,7-dichloronaphthalene-1,4,5,8-tetracarboxylic acid dianhydride,
2,3,6,7-tetrachloronaphthalene-1,4,5,8-tetracarboxylic acid dianhydride,
phenanthrene-1,8,9,10-tetracarboxylic acid dianhydride,
pyrazine-2,3,5,6-tetracarboxylic acid dianhydride,
thiophene-2,3,4,5-tetracarboxylic acid dianhydride,
2,3,3',4'-biphenyltetracarboxylic acid dianhydride,
3,4,3',4'-biphenyltetracarboxylic acid dianhydride,
2,3,2',3'-biphenyltetracarboxylic acid dianhydride,
bis(3,4-dicarboxyphenyl)dimethylsilane dianhydride,
bis(3,4-dicarboxyphenyl)methylphenylsilane dianhydride,
bis(3,4-dicarboxyphenyl)diphenylsilane dianhydride,
1,4-bis(3,4-dicarboxyphenyldimethylsilyl)benzene dianhydride,
1,3-bis(3,4-dicarboxyphenyl)-1,1,3,3-tetramethyldicyclohexane dianhydride,
p-phenylbis(trimellitic monoester acid anhydride),
ethyleneglycolbis(trimellitic acid anhydride),
propanediolbis(trimellitic acid anhydride),
butanediolbis(trimellitic acid anhydride),
pentanediolbis(trimellitic acid anhydride),
hexanediolbis(trimellitic acid anhydride),
octanediolbis(trimellitic acid anhydride),
decanediolbis(trimellitic acid anhydride),
ethylenetetracarboxylic acid dianhydride,
1,2,3,4-butanetetracarboxylic acid dianhydride,
decahydronaphthalene-1,4,5,8-tetracarboxylic acid dianhydride,
4,8-dimethyl-1,2,3,5,6,7-hexahydronaphthalene-1,2,5,6-tetracarboxylic acid dianhydride,
cyclopentane-1,2,3,4-tetracarboxylic acid dianhydride,
pyrrolidine-2,3,4,5-tetracarboxylic acid dianhydride,
1,2,3,4-cyclobutanetetracarboxylic acid dianhydride,
bis[exo-bicyclo(2,2,1)heptane-2,3-dicarboxylic acid anhydride]sulfone,
bicyclo-(2,2,2)-octo(7)-ene-2,3,5,6-tetracarboxylic acid dianhydride,
2,2-bis(3,4-dicarboxyphenyl)hexafluoropropane dianhydride,
2,2-bis[4-(3,4-dicarboxyphenoxy)phenyl]hexafluoropropane dianhydride,
4,4'-bis(3,4-dicarboxyphenoxy)diphenyl sulfide dianhydride,
1,4-bis(2-hydroxyhexafluoroisopropyl)benzenebis(trimellitic acid anhydride),
1,3-bis(2-hydroxyhexafluoroisopropyl)benzenebis(trimellitic acid anhydride),
5-(2,5-dioxotetrahydrofuryl)-3-methyl-3-cyclohexene-1,2-dicarboxylic acid anhydride, and
tetrahydrofuran-2,3,4,5-tetracarboxylic acid dianhydride.

These tetracarboxylic acid dianhydrides may be used as a mixture comprising two or more of them.

The fluorine-containing diamine compounds represented by the above-shown formula (III) are the novel compounds and have a long-chain or bulky perfluoroalkenyl group in the molecule. In the above reaction, this fluorine-containing aromatic diamine compound is preferably used in an amount of 5 to 100 mol %, more preferably 10 to 100 mol %, based on the total amount of the diamine compounds used. When the amount of said fluorine-containing aromatic diamine compound used is below the above-defined range, the effect of improving moisture resistance and the effect of reducing dielectric constant tend to lower.

Listed below are examples of the fluorine-containing aromatic diamine compounds represented by the formula (III) which are usable in the above reaction:
1,3-diamino-5-(perfluorononenyloxy)benzene,
1,3-diamino-4-methyl-5-(perfluorononenyloxy)benzene,
1,3-diamino-4-methoxy-5-(perfluorononenyloxy)benzene,
1,3-diamino-2,4,6-trifluoro-5-(perfluorononenyloxy)benzene,
1,3-diamino-4-chloro-5-(perfluorononenyloxy)benzene,
1,3-diamino-4-bromo-5-(perfluorononenyloxy)benzene,
1,2-diamino-4-(perfluorononenyloxy)benzene,
1,2-diamino-4-methyl-5-(perfluorononenyloxy)benzene,
1,2-diamino-4-methoxy-5-(perfluorononenyloxy)benzene,
1,2-diamino-3,4,6-trifluoro-5-(perfluorononenyloxy)benzene,
1,2-diamino-4-chloro-5-(perfluorononenyloxy)benzene,
1,2-diamino-4-bromo-5-(perfluorononenyloxy)benzene,
1,4-diamino-3-(perfluorononenyloxy)benzene,
1,4-diamino-2-methyl-5-(perfluorononenyloxy)benzene, 1,4-diamino-2-methoxy-5-(perfluorononenyloxy)benzene,
1,4-diamino-2,3,6-trifluoro-5-(perfluorononenyloxy)benzene,
1,4-diamino-2-chloro-5-(perfluorononenyloxy)benzene,
1,4-diamino-2-bromo-5-(perfluorononenyloxy)benzene,
1,3-diamino-5-(perfluorohexenyloxy)benzene,
1,3-diamino-4-methyl-5-(perfluorohexenyloxy)benzene,
1,3-diamino-4-methoxy-5-(perfluorohexenyloxy)benzene,
1,3-diamino-2,4,6-trifluoro-5-(perfluorohexenyloxy)benzene,
1,3-diamino-4-chloro-5-(perfluorohexenyloxy)benzene,
1,3-diamino-4-bromo-5-(perfluorohexenyloxy)benzene,
1,2-diamino-4-(perfluorohexenyloxy)benzene,
1,2-diamino-4-methyl-5-(perfluorohexenyloxy)benzene,
1,2-diamino-4-methoxy-5-(perfluorohexenyloxy)benzene,
1,2-diamino-3,4,6-trifluoro-5-(perfluorohexenyloxy)benzene,
1,2-diamino-4-chloro-5-(perfluorohexenyloxy)benzene,
1,2-diamino-4-bromo-5-(perfluorohexenyloxy)benzene,
1,4-diamino-3-(perfluorohexenyloxy)benzene,
1,4-diamino-2-methyl-5-(perfluorohexenyloxy)benzene,
1,4-diamino-2-methoxy-5-(perfluorohexenyloxy)benzene,
1,4-diamino-2,3,6-trifluoro-5-(perfluorohexenyloxy)benzene,
1,4-diamino-2-chloro-5-(perfluorohexenyloxy)benzene, and
1,4-diamino-2-bromo-5-(perfluorohexenyloxy)benzene.

A perfluorononenyl group is $-C_9F_{17}$, and a perfluorohexenyl group is $-C_6F_{11}$ (these are the same hereinafter). In the above-shown compounds, the perfluorononenyl group or perfluorohexenyl group may be replaced with other groups such as $-C_{10}F_{19}$ and $-C_{12}F_{23}$.

The fluorine-containing aromatic diamine compounds represented by the formula (III) can be produced by subjecting a fluorine-containing aromatic diurethane compound of the formula (IV):

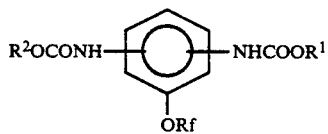

(IV)

(wherein Rf is as defined above with reference to the formula (I); $R^1$ and $R^2$ represent independently an alkyl group which may be substituted or an aryl group which may be substituted; hydrogen in the aromatic ring may be substituted with an appropriate substituent such as a lower alkyl group, a lower alkoxyl group, fluorine, chlorine and bromine; and two urethane groups are bonded to the aromatic ring at the ortho-, meta- or para-position in relation to the ether linkage) to a deprotection reaction for the urethane type protecting group.

Examples of the compounds represented by the formula (IV) are listed below:
1,3-bis[N-(methyloxycarbonyl)amino]-5-(perfluorononenyloxy)benzene,
1,3-bis[N-(ethyloxycarbonyl)amino]-5-(perfluorononenyloxy)benzene,
1,3-bis[N-(n-propyloxycarbonyl)amino]-5-(perfluorononenyloxy)benzene,
1,3-bis[N-(i-propyloxycarbonyl)amino]-5-(perfluorononenyloxy)benzene,
1,3-bis[N-(n-butyloxycarbonyl)amino]-5-(perfluorononenyloxy)benzene,
1,3-bis[N-(i-butyloxycarbonyl)amino]-5-(perfluorononenyloxy)benzene,
1,3-bis[N-(t-butyloxycarbonyl)amino]-5-(perfluorononenyloxy)benzene,
1,3-bis[N-(pentyloxycarbonyl)amino]-5-(perfluorononenyloxy)benzene,
1,3-bis[N-(hexyloxycarbonyl)amino]-5-(perfluorononenyloxy)benzene,
1,3-bis[N-(heptyloxycarbonyl)amino]-5-(perfluorononenyloxy)benzene,
1,3-bis[N-(octyloxycarbonyl)amino]-5-(perfluorononenyloxy)benzene,
1,3-bis[N-(benzyloxycarbonyl)amino]-5-(perfluorononenyloxy)benzene,
1,3-bis[N-(phenyloxycarbonyl)amino]-5-(perfluorononenyloxy)benzene,
1,2-bis[N-(methyloxycarbonyl)amino]-4-(perfluorononenyloxy)benzene,
1,2-bis[N-(ethyloxycarbonyl)amino]-4-(perfluorononenyloxy)benzene,
1,2-bis[N-(n-propyloxycarbonyl)amino]-4-(perfluorononenyloxy)benzene,
1,2-bis[N-(i-propyloxycarbonyl)amino]-4-(perfluorononenyloxy)benzene,
1,2-bis[N-(n-butyloxycarbonyl)amino]-4-(perfluorononenyloxy)benzene,
1,2-bis[N-(i-butyloxycarbonyl)amino]-4-(perfluorononenyloxy)benzene,
1,2-bis[N-(t-butyloxycarbonyl)amino]-4-(perfluorononenyloxy)benzene,
1,2-bis[N-(pentyloxycarbonyl)amino]-4-(perfluorononenyloxy)benzene,
1,2-bis[N-(hexyloxycarbonyl)amino]-4-(perfluorononenyloxy)benzene,
1,2-bis[N-(heptyloxycarbonyl)amino]-4-(perfluorononenyloxy)benzene,
1,2-bis[N-(octyloxycarbonyl)amino]-4-(perfluorononenyloxy)benzene,
1,2-bis[N-(benzyloxycarbonyl)amino]-4-(perfluorononenyloxy)benzene,
1,2-bis[N-(phenyloxycarbonyl)amino]-4-(perfluorononenyloxy)benzene,
1,4-bis[N-(methyloxycarbonyl)amino]-3-(perfluorononenyloxy)benzene,
1,4-bis[N-(ethyloxycarbonyl)amino]-3-(perfluorononenyloxy)benzene,
1,4-bis[N-(n-propyloxycarbonyl)amino]-3-(perfluorononenyloxy)benzene,
1,4-bis[N-(i-propyloxycarbonyl)amino]-3-(perfluorononenyloxy)benzene,
1,4-bis[N-(n-butyloxycarbonyl)amino]-3-(perfluorononenyloxy)benzene,
1,4-bis[N-(i-butyloxycarbonyl)amino]-3-(perfluorononenyloxy)benzene,
1,4-bis[N-(t-butyloxycarbonyl)amino]-3-(perfluorononenyloxy)benzene,
1,4-bis[N-(pentyloxycarbonyl)amino]-3-(perfluorononenyloxy)benzene,
1,4-bis[N-(hexyloxycarbonyl)amino]-3-(perfluorononenyloxy)benzene,
1,4-bis[N-(heptyloxycarbonyl)amino]-3-(perfluorononenyloxy)benzene,
1,4-bis[N-(octyloxycarbonyl)amino]-3-(perfluorononenyloxy)benzene, 1,4-bis[N-(benzyloxycarbonyl)amino]-3-(perfluorononenyloxy)benzene,
1,4-bis[N-(phenyloxycarbonyl)amino]-3-(perfluorononenyloxy)benzene,
1,3-bis[N-(methyloxycarbonyl)amino]-5-(perfluorohexenyloxy)benzene,
1,3-bis[N-(ethyloxycarbonyl)amino]-5-(perfluorohexenyloxy)benzene,
1,3-bis[N-(n-propyloxycarbonyl)amino]-5-(perfluorohexenyloxy)benzene,
1,3-bis[N-(i-propyloxycarbonyl)amino]-5-(perfluorohexenyloxy)benzene,
1,3-bis[N-(n-butyloxycarbonyl)amino]-5-(perfluorohexenyloxy)benzene,
1,3-bis[N-(i-butyloxycarbonyl)amino]-5-(perfluorohexenyloxy)benzene,
1,3-bis[N-(t-butyloxycarbonyl)amino]-5-(perfluorohexenyloxy)benzene,
1,3-bis[N-(pentyloxycarbonyl)amino]-5-(perfluorohexenyloxy)benzene,
1,3-bis[N-(hexyloxycarbonyl)amino]-5-(perfluorohexenyloxy)benzene,
1,3-bis[N-(heptyloxycarbonyl)amino]-5-(perfluorohexenyloxy)benzene,
1,3-bis[N-(octyloxycarbonyl)amino]-5-(perfluorohexenyloxy)benzene,
1,3-bis[N-(benzyloxycarbonyl)amino]-5-(perfluorononenyloxy)benzene,
1,3-bis[N-(phenyloxycarbonyl)amino]-5-(perfluorohexenyloxy)benzene,
1,2-bis[N-(methyloxycarbonyl)amino]-4-(perfluorohexenyloxy)benzene,
1,2-bis[N-(ethyloxycarbonyl)amino]-4-(perfluorohexenyloxy)benzene,
1,2-bis[N-(n-propyloxycarbonyl)amino]-4-(perfluorohexenyloxy)benzene,
1,2-bis[N-(i-propyloxycarbonyl)amino]-4-(perfluorohexenyloxy)benzene,
1,2-bis[N-(n-butyloxycarbonyl)amino]-4-(perfluorohexenyloxy)benzene,
1,2-bis[N-(i-butyloxycarbonyl)amino]-4-(perfluorohexenyloxy)benzene,
1,2-bis[N-(t-butyloxycarbonyl)amino]-4-(perfluorohexenyloxy)benzene,
1,2-bis[N-(pentyloxycarbonyl)amino]-4-(perfluorohexenyloxy)benzene,
1,2-bis[N-(hexyloxycarbonyl)amino]-4-(perfluorohexenyloxy)benzene,
1,2-bis[N-(heptyloxycarbonyl)amino]-4-(perfluorohexenyloxy)benzene,
1,2-bis[N-(octyloxycarbonyl)amino]-4-(perfluorohexenyloxy)benzene,
1,2-bis[N-(benzyloxycarbonyl)amino]-4-(perfluorohexenyloxy)benzene,
1,2-bis[N-(phenyloxycarbonyl)amino]-4-(perfluorohexenyloxy)benzene,
1,4-bis[N-(methyloxycarbonyl)amino]-3-(perfluorohexenyloxy)benzene,
1,4-bis[N-(ethyloxycarbonyl)amino]-3-(perfluorohexenyloxy)benzene,
1,4-bis[N-(n-propyloxycarbonyl)amino]-3-(perfluorohexenyloxy)benzene,
1,4-bis[N-(i-propyloxycarbonyl)amino]-3-(perfluorohexenyloxy)benzene,
1,4-bis[N-(n-butyloxycarbonyl)amino]-3-(perfluorohexenyloxy)benzene,
1,4-bis[N-(i-butyloxycarbonyl)amino]-3-(perfluorohexenyloxy)benzene,
1,4-bis[N-(t-butyloxycarbonyl)amino]-3-(perfluorohexenyloxy)benzene,
1,4-bis[N-(pentyloxycarbonyl)amino]-3-(perfluorohexenyloxy)benzene,
1,4-bis[N-(hexyloxycarbonyl)amino]-3-(perfluorohexenyloxy)benzene,
1,4-bis[N-(heptyloxycarbonyl)amino]-3-(perfluorohexenyloxy)benzene,
1,4-bis[N-(octyloxycarbonyl)amino]-3-(perfluorohexenyloxy)benzene,
1,4-bis[N-(benzyloxycarbonyl)amino]-3-(perfluorononenyloxy)benzene, and
1,4-bis[N-(phenyloxycarbonyl)amino]-3-(perfluorohexenyloxy)benzene.

In the above-shown compounds, the perfluorononenyl group and perfluorohexenyl group may be replaced with other groups such as $-C_{10}F_{19}$ and $-C_{11}F_{23}$.

The "urethane type protecting group" mentioned above means specifically $-COOR^1$ and $-COOR^2$ in the formula (IV).

The deprotection reaction can be accomplished by various methods. The following methods are typical: hydrogen gas is passed through a solution formed by dissolving a fluorine-containing aromatic diurethane compound such as mentioned above in an organic solvent such as ethyl acetate, dimethylformamide, dimethylacetamide, benzene, xylene, acetone, tetrahydrofuran and the like, at 0° to 100° C. (preferably at or around room temperature) in the presence of a catalyst such as palladium carbon (the duration of passage of hydrogen gas can be properly determined, but usually 1 to 10 hours are enough for the purpose); a fluorine-containing aromatic diurethane compound is dissolved in an organic solvent such as mentioned above and then added with a hydroacid such as HF, HBr, HCl, $H_2SO_4$ and the like for reacting them (in carrying out the reaction, the hydroacid is preferably added in an amount greater than equivalent to the fluorine-containing diurethane compound. In case of using HF, the reaction is preferably conducted at a temperature below room temperature, especially below 0° C., and in case of using other hydroacids, it is preferable to perform the reaction at 0° to 100° C., especially around room temperature. The reaction time can be determined properly, but usually 0.1 to 1 hour is sufficient in case of using HF and 1 to 10 hours in case of using other hydroacids); a fluorine-containing aromatic diurethane compound is reacted with a basic compound such as sodium hydrogencarbonate, potassium hydrogencarbonate, sodium hydroxide, potassium hydroxide and the like in the presence of water (water is preferably used in an amount greater than equivalent to the fluorine-containing diurethane compound). The reaction may be conducted by using a solvent other than said organic solvents, such as water, an alcohol such as methanol and ethanol, cresol and the like).

The thus obtained aromatic diamine compounds of the formula (III) can be purified by suitable means, for example, recrystallization from an alcohol.

The aromatic diurethane compounds represented by the formula (IV) can be produced by reacting a fluorine-containing aromatic dicarboxylic acid compound represented by the formula (V):

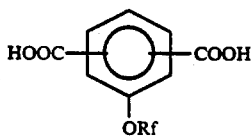

(V)

(wherein Rf is as defined above with reference to the formula (I); hydrogen in the aromatic ring may be optionally substituted with an appropriate substituent such as a lower alkyl group, a lower alkoxyl group, fluorine, chlorine, bromine, etc.; and two carboxyl groups are bonded to the aromatic ring at the ortho-, meta- or para-position in relation to the ether linkage), an azide compound represented by the formula (VI):

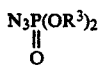

(VI)

(wherein $R^3$ represents a lower alkyl group or an aryl group) and an alcohol represented by the formula (VII):

(VII)

(wherein $R^4$ represents an alkyl group which may have a substituent or an aryl group which may have a substituent) in a solvent or without using a solvent in the presence of a base.

Examples of the dicarboxylic acids represented by the formula (V) are shown below:

5-(perfluorononenyloxy)isophthalic acid,
4-(perfluorononenyloxy)phthalic acid,
2-(perfluorononenyloxy)terephthalic acid,
4-methyl-5-(perfluorononenyloxy)isophthalic acid,
4-methoxy-5-(perfluorononenyloxy)isophthalic acid,
2,4,6-trifluoro-5-(perfluorononenyloxy)isophthalic acid,
4-chloro-5-(perfluorononenyloxy)isophthalic acid,
4-bromo-5-(perfluorononenyloxy)isophthalic acid,
4-methyl-5-(perfluorononenyloxy)phthalic acid,
4-methoxy-5-(perfluorononenyloxy)phthalic acid,
3,4,6-trifluoro-5-(perfluorononenyloxy)phthalic acid,
4-chloro-5-(perfluorononenyloxy)phthalic acid,
4-bromo-5-(perfluorononenyloxy)phthalic acid,
2-methyl-5-(perfluorononenyloxy)terephthalic acid,
4-methoxy-5-(perfluorononenyloxy)terephthalic acid,
2,3,6-trifluoro-5-(perfluorononenyloxy)terephthalic acid,
2-chloro-5-(perfluorononenyloxy)terephthalic acid,
2-bromo-5-(perfluorononenyloxy)terephthalic acid,
5-(perfluorohexenyloxy)isophthalic acid,
4-(perfluorohexenyloxy)phthalic acid,
2-(perfluorohexenyloxy)terephthalic acid,
4-methyl-5-(perfluorohexenyloxy)isophthalic acid,
4-methoxy-5-(perfluorohexenyloxy)isophthalic acid,
2,4,6-trifluoro-5-(perfluorohexenyloxy)isophthalic acid,
4-chloro-5-(perfluorohexenyloxy)isophthalic acid,
4-bromo-5-(perfluorohexenyloxy)isophthalic acid,
4-methyl-5-(perfluorohexenyloxy)phthalic acid,
4-methoxy-5-(perfluorohexenyloxy)phthalic acid,
3,4,6-trifluoro-5-(perfluorohexenyloxy)phthalic acid,
4-chloro-5-(perfluorohexenyloxy)phthalic acid,
4-bromo-5-(perfluorohexenyloxy)phthalic acid,
2-methyl-5-(perfluorohexenyloxy)terephthalic acid,
4-methoxy-5-(perfluorohexenyloxy)terephthalic acid,
2,3,6-trifluoro-5-(perfluorohexenyloxy)terephthalic acid,
2-chloro-5-(perfluorohexenyloxy)terephthalic acid, and
2-bromo-5-(perfluorohexenyloxy)terephthalic acid.

The perfluorononenyloxyisophthalic acids and perfluorohexenyloxyisophthalic acids mentioned above can be produced, for instance, by reacting a trimer or dimer of hexafluoropropene and a hydroxyisophthalic acid in an aprotic polar solvent in the presence of a basic catalyst such as triethylamine at a temperature below room temperature according to the method shown in Japanese Patent Application Kokai (Laid-Open) No. 60-51146.

It is also possible to prepare other dicarboxylic acids by using the oligomers other than trimers and dimers of hexafluoropropene or the oligomers of other fluoroalkenes in the above method.

The dicarboxylic acids represented by the formula (IV) can be produced, for instance, by reacting an ester such as diphenyl ester or dibenzyl ester of hydroxydicarboxybenzene and a fluoroalkene oligomer such as a fluoropropene trimer or tetrafluoroethylene pentomer in an aprotic organic solvent in the presence of a basic catalyst such as triethylamine at a temperature close to or below room temperature, isolating the reaction product, hydrolyzing this reaction product in the presence of a basic compound such as sodium hydroxide, potassium hydroxide and the like, and further properly treating the hydrolyzate with an acid such as hydrochloric acid. Said reaction product and the final product may be purified by suitable means such as washing, recrystalliation, etc.

The compounds represented by the formula (VI) include, for instance, diphenylphosphorylazide, diethylphosphorylazide, di-p-nitrophenylphosphorylazide and dimorphosphorylazide.

The alcohols represented by the formula (V) include methanol, ethanol, n-propanol, i-propanol, n-butanol, i-butanol, t-butanol, pentanol, hexanol, heptanol, octanol, phenol, and benzylalcohol.

For the synthesis of the fluorine-containing aromatic diurethane compounds represented by the formula (IV), a new Curtius reaction such as shown in Bulletin of Orgarno-Synthetic Chemical Society, Vol. 31, No. 8, pp. 666–674, 1973, can be applied. That is, the objective fluorine-containing aromatic diurethane compound can be obtained by reacting a dicarboxylic acid compound of the formula (V), an azide compound of the formula (VI) and an alcohol of the formula (VII) in the presence of a base. As base, a tertiary amine such as trimethylamine, triethylamine, pyridine, etc., is preferably used. The above reaction is performed in an organic solvent or by letting an alcohol of the formula (VII) serve as a solvent, too. As the organic solvent, benzene, toluene, tetrahydrofuran, dioxane, diethyl ether and the like are preferably used. Two or more of these solvents may be used as a mixture if they are compatible with each other.

In the course of the above reaction, there is produced an azide carboxylate from the reaction of a dicarboxylic acid compound of the formula (V) and an azide compound of the formula (VI), and this azide carboxylate undergoes a thermal rearrangement reaction to produce an isocyanate compound. The subject reaction can be carried out after once isolating or without isolating these intermediates. The conditions for the above reaction are variable depending on the reagents used and not specifically defined, but it is preferred to adopt the following conditions.

Firstly, in case of obtaining an objective fluorine-containing aromatic diurethane compound from an apparently one-step reaction process in which a dicarboxylic acid compound of the formula (V), an azide compound of the formula (VI), a tertiary amine and an alcohol of the formula (VII) are reacted all at once, the reaction temperature is preferably set within the range from −80° to 250° C., especially from room temperature to 150° C. It is also preferred to use said azide compound, tertiary amine and alcohol in amounts of 0.5 to 5.0 moles, 0.5 to 3.0 moles and 0.5 mole to large excess, respectively, per mole of said dicarboxylic acid compound.

Secondarily, in case of once isolating said azide carboxylate (intermediate product) in the course of the reaction, said dicarboxylic acid compound and said azide compound are first reacted in the presence of said tertiary amine, and the produced azide carboxylate is isolated. In this case, the reaction temperature is preferably set between −80° and +100° C., and the amounts of said azide compound and tertiary amine are preferably selected to be 0.5 to 5.0 moles and 0.5 to 3.0 moles, respectively, per mole of said dicarboxylic acid compound. Then the isolated azide carboxylate is reacted in an alcohol of an amount of 0.5 molar equivalent to large excess to said azide carboxylate to thereby obtain the objective fluorine-containing aromatic diurethane compound. This reaction is preferably conducted at a temperature in the range of −80° to +250° C.

Thirdly, in case of once isolating the isocyanate compound, a dicarboxylic acid compound of the formula (V) and an azide compound of the formula (VI) are first reacted in the presence of a tertiary amine, and the resultantly produced isocyanate is isolated. In this reaction, said azide compound and said tertiary amine are preferably used in amounts of 0.5 to 5 moles and 0.5 to 3.0 moles, respectively, per mole of the dicarboxylic acid compound, and the reaction temperature is preferably set in the range from −80° to +250° C. Then the thus obtained isocyanate is reacted in an alcohol of an amount of 0.5 molar equivalent to large excess to said isocyanate to give the objective fluorine-containing diurethane compound. The reaction temperature in this step is preferably selected from within the range of −80° to +250° C.

One of the above-described three options is selected by taking into consideration the yield and other factors involved.

The fluorine-containing aromatic diurethane compounds obtained in the manner described above can be purified by recrystallization from hexane or other suitable solvents.

Regarding Rf in the above-shown formulae (I)–(IV), the group represented by Rf may be either straight-chain or branched, but the latter case is preferred becaused the branched structure is more apt to raise glass transition temperature of polyimide resins as the branched structure is more compact in terms of steric structure than the straight-chain structure.

Examples of the groups represented by Rf in the formulae (I) to (IV) are shown below.

Perfluorononenyl groups:

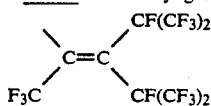 (A)

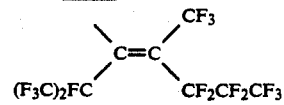 (B)

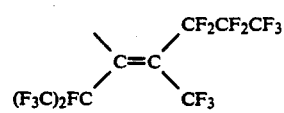 (C)

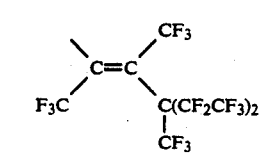 (D)

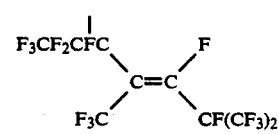 (E)

Perfluorohexenyl groups:

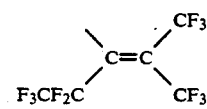 (F)

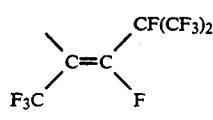 (G)

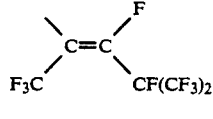 (H)

Perfluorodecenyl group:

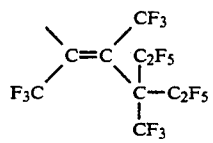 (J)

Examples of the diamine compounds that can be used jointly with the aromatic diamine compounds of the formula (III) in the polyimide resin preparation process of this invention are listed below:
4-aminophenyl-3-aminobenzoic acid,
2,2-bis(4-aminophenyl)propane,
2,6-diaminopyridine,
bis(4-aminophenyl)diethylsilane,
bis(4-aminophenyl)diphenylsilane,
bis-(4-aminophenyl)ethylphosphine oxide,
bis-(4-aminophenyl)-N-butylamine,
bis-(4-aminophenyl)-N-methylamine,
N-(3-aminophenyl)-4-aminobenzamide,
4-aminophenyl-3-aminobenzoic acid,
3,3'-diaminodiphenylmethane,
3,3'-diaminodiphenyl ether,
3,3'-diaminodiphenylsulfone,
3,3'-diaminodiphenylpropane,
3,3'-diaminodiphenyl sulfide,
p-phenylenediamine,
m-phenylenediamine, 4,4'-diaminodiphenylpropane,
4,4'-diaminodiphenylmethane,
3,3'-diaminobenzophenone,
4,4'-diaminodiphenyl sulfide,
4,4'-diaminodiphenylsulfone,
4,4'-diaminodiphenyl ether,
3,4'-diaminodiphenyl ether,
1,5-diaminonaphthalene,
2,4-bis($\beta$-amino-t-butyl)toluene,
bis(p-$\beta$-amino-t-butyl-phenyl) ether,
bis(p-$\beta$-methyl-$\gamma$-amino-pentyl)benzene,
bis-p-(1,1-dimethyl-5-aminopentyl)benzene,
hexamethylenediamine,
heptamethylenediamine,
octamethylenediamine,
nonamethylenediamine,
decamethylenediamine,
tetramethylenediamine,
propylenediamine,
3-methylheptamethylenediamine,
4,4'-dimethylheptamethylenediamine,
2,11-diaminododecane,
1,2-bis(3-aminopropoxy)ethane,
2,2-dimethylpropylenediamine,
3-methoxy-hexamethylenediamine,
2,5-dimethylhexamethylenediamine,
2,5-dimethylheptamethylenediamine,
5-methylnonamethylenediamine,
2,17-diaminoeicosadecane,
1,4-diaminocyclohexane,
1,10-diamino-1,10-dimethyldecane,
1,12-diaminooctadecane,
2,2-bis(4-aminophenyl)hexafluoropropane,
2,2-bis[4-(4-aminophenoxy)phenyl]hexafluoropropane.

These compounds may be used as a mixture of two or more of them.

A siliconediamine may be used as part of the diamine. Examples of such silicondiamine are 1,3-bis(3-aminopropyl)-1,1,1,1-tetraphenyldisiloxane, 1,3-bis(3-aminopropyl)-1,1,1,1-tetramethyldisiloxane and 1,3-bis( 4-aminobutyl)-1,1,1,1-tetramethyldisiloxane. In case of using a silicondiamine, its amount used is preferably 0.1 to 10 mol % based on the total amount of the diamine. Use of a silicondiamine improves adhesiveness of the obtained polyimide resin.

Said polyimides or the precursors thereof can be produced by reacting said tetracarboxylic acid dianhydrides and said diamines at an appropriate temperature. In this reaction, the degree of imidization can be optionally adjusted by selecting the appropriate reaction conditions. For example, by carrying out the reaction at a temperature above 100° C., especially above 120° C., if desired, in the presence of a catalyst such as tributylamine, triethylamine, triphenyl phosphite or the like, or by imidizing in the presence of a catalyst such as tributylamine, triethylamine, triphenyl phosphite or the like, it is possible to produce a perfectly or almost perfectly imidized polyimide. (The amount of the catalyst used in this reaction is preferably 0 to 15 wt %, more preferably 0.01 to 15 wt % based on the total amount of the reactants). When the reaction is conducted at a temperature below 80° C., especially below 50° C., there can be produced a polyamide-acid which is a precursor of polyimide and scarcely or not a bit imidized. It is also possible to produce a polyimide precursor which has been partially imidized.

Further, by conducting chemical ring closure (imidization) of said polyamide-acid or partially imidized polyimide precursor at a temperature above 100° C., especially above 120° C., by using, if necessary, a ring closing agent, e.g. an acid anhydride such as acetic anhydride, propionic anhydride, benzoic anhydride, etc., or a carbodiimide such as dicyclohexylcarbodiimide, and further adding, if so required, a ring closing catalyst such as pyridine, isoquinoline, trimethylamine, aminopyridine, imidazol, etc. (the ring closing agent and ring closing catalyst being preferably used in amounts within the range of 1 to 8 moles per mole of the acid anhydride), there can be produced a polyimide which has substantially or perfectly gone through imidization. These reactions are preferably carried out in the presence of an organic solvent.

Examples of the organic polar solvents usable in the above reaction are N,N-dimethylformamide, N,N-dimethylacetamide, N-methyl-2-pyrrolidone, dimethyl sulfoxide, hexamethylphosphoramide, phenol, m-cresol, chlorobenzene and the like. Two or more of these solvents may be used in admixture if they are compatible with each other. Along with an organic polar solvent, there can also be used a general-purpose solvent such as toluene, xylene, Cellosolve acetate, methyl Cellosolve, etc., within limits not prejudicious to solubility of the polyimide resin or its precursor.

No particular restrictions are imposed on the order of addition of the reactants.

In the preparation of polyimides or the precursors thereof according to this invention, a hexacarboxylic acid trianhydride may be used together with a tetracarboxylic acid dianhydride as acid anhydride. In this case, the reaction is preferably carried out by using, as acid anhydride, 65 mol % or more of a tetracarboxylic acid dianhydride and 35 mol % or less of a hexacarboxylic acid trianhydride while allowing presence of 99.5 mol % or less of a fluorine-containing aromatic diamine of the formula (III), 0.5 mol % or more of an aromatic diamine having at least one substituent at the ortho-position for at least one amino group (hereinafter referred to as "specific aromatic diamine") and, if necessary, other diamine(s).

Said hexacarboxylic acid trianhydride can be obtained by reacting a compound having three amino groups (such as 3,3',5-triaminobenzophenone) or a compound having three hydroxyl groups and anhydrous trimellitic acid chloride in such a manner as to form an amide linkage or ester linkage, or by reacting a compound having three amino or hydroxyl groups and benzene (dimethylbenzoic acid chloride) having two methyl groups and one —CO—Cl group having ortho positional relation to each other such as 3,4-dimethylbenzoic acid chloride in a way to form an amide linkage or ester linkage, oxidizing the methyl groups into carboxyl groups and dehydrating the resulting product. Said hexacarboxylic acid trianhydride can be also produced by subjecting 1,3,5-trichlorobenzene and dimethylchlorobenzene to a coupling reaction, oxidizing the methyl groups and dehydrating the reaction product. It is further possible to adopt a method which comprises reacting a compound having three hydroxyl groups and a dimethylchlorobenzene such as 1,2-dimethyl-4-chlorobenzene so as to form an ether linkage, oxidizing the methyl groups into carboxyl groups and dehydrating the reaction product.

The hexacarboxylic acid trianhydrides obtained in the manners described above can be represented by the following formula (VIII):

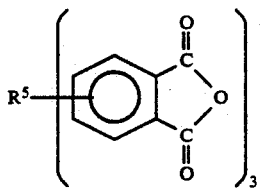

(VIII)

(wherein $R^5$ represents a trivalent organic group).

For the reason of easiness of operation, said hexacarboxylic acid trianhydride is preferably produced by reacting a compound having three hydroxyl groups in the molecule and trimellitic anhydride in an organic solvent in the presence of a tertiary amine. Examples of the compounds having three hydroxyl groups in the molecule, which are usable in the above reaction, include glycerin, trimethylolethane, trimethylolpropane, 1,2,6-hexanetriol, 2,4-dihydroxy-3-hydroxymethylpentane, 2,6-bis(hydroxymethyl)butane-3-ol, 3-methylpentane-1,3,5-triol, 1,3,5-trihydroxybenzene, 1,2,3-trihydroxybenzene, 1,2,4-trihydroxybenzene, 2,4,5-trihydroxybutylphenone, 2,3,4-trihydroxybenzaldehyde, α,α',α"-(4-hydroxyphenyl)-1,3,5-triisopropylbenzene, 2,6-bis[(2-hydroxy-5-methylphenyl)methyl]-4-methylphenol, and 2,3,4-trihydroxyacetophenone. In the above reaction, an amount of said compound having three hydroxyl groups in the molecule is preferably 1 mol to 3 mols of trimellitic anhydride. The organic solvent used in the above reaction can be, for example, benzene, toluene, xylene, tetrahydrofuran, 1,4-dioxane, diethyl ether, 1,2-dichloroethane, chlorobenzene, dichloroethane or the like. Two or more of these solvents may be used in admixture. The organic solvent used in the above reaction is preferably dried by molecular sieves or other suitable means. The tertiary amines usable in the above reaction include pyridine, triethylamine, tributylamine and the like. Two or more of these amines may be used in admixture. Such tertiary amine(s) is preferably used in an amount of 1 to 2 equivalents to the trimellitic anhydride. Reaction temperature and reaction time are not specified, but the reaction is preferably conducted at a temperature below 50° C. for a period within 3 hours. Otherwise, there may be produced an oligomer-like substance to reduce the yield.

The hexacarboxylic acid trianhydrides obtained in the manner described above are represented by the following formula (IX):

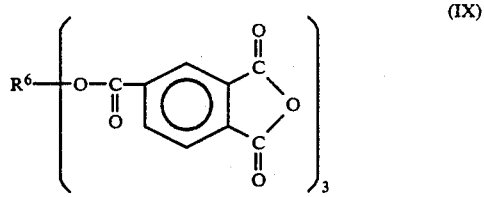

(IX)

(wherein $R^6$ presents a trivalent organic group).

This hexacarboxylic acid trianhydride is preferably used in an amount of 3 to 35 mol %, more preferably 7 to 30 mol %, based on the total amount of the acid anhydride. If its amount is less than 3 mol %, there will not be provided the desired effect of crosslinkage, and if its amount exceeds 35 mol %, there will take place gelation in the course of synthesis of polyimide, making it unable to obtain a homogeneous varnish. Two or more varieties of said acid anhydride may be used in admixture provided that their combined amount is within the above-defined range.

As typical examples of said acid trianhydrides, there can be mentioned trimellitic acid triglyceride trianhydride, 1,1,1-tris(methyl trimellitate)propane trianhydride and 1,1,1-tris(methyl trimellitate)ethane trianhydride.

Said specific aromatic diamines are preferably those diamines which are represented by the following formula (X):

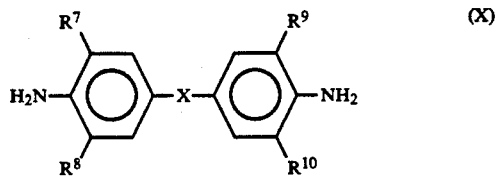

(X)

(wherein $R^7$, $R^8$, $R^9$ and $R^{10}$ represent independently hydrogen, an alkyl group such as methyl group, ethyl group, isopropyl group, etc., a fluorine-substituted alkyl group, an alkoxyl group such as a methoxy group, an ethoxy group, a butoxy group, etc., or a halogen (chlorine, bromine, fluorine or iodine), with at least one of $R^7$, $R^8$, $R^9$ and $R^{10}$ being a group other than hydrogen, and X represents —CH—, C(CH$_3$)$_2$—, —C(CF$_3$)$_2$—, —O—, —C(=O)—, SO$_2$— or —S— or linkage). In the above formula (X), it is especially preferable that at least one of $R^7$ and $R^8$ and at least one of $R^9$ and $R^{10}$ are a group other than hydrogen.

Listed below are the examples of said specific aromatic diamines:

3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-difluoro-4,4'-diaminodiphenylmethane, 3,3'-dichloro-4,4'-diaminodiphenylmethane, 3,3'-dibromo-4,4'-diaminodiphenylmethane, 3,3'-di(trifluoromethyl)-4,4'-diaminodiphenylmethane, 3,3'-dimethyl-4,4'-diaminodiphenyl ether, 3,3'-diisopropyl-4,4'-diaminodiphenyl ether, 3,3'-dimethoxy-4,4'-diaminodiphenyl ether, 3,3'-diethoxy-4,4'-diaminodiphenyl ether, 3,3'-difluoro-4,4'-diaminodiphenyl ether, 3,3'-dichloro-4,4'-diaminodiphenyl ether, 3,3'-dibromo-4,4'-diaminodiphenyl ether, 3,3'-di(trifluoromethyl)-4,4'-diaminodiphenyl ether, 3,3'-dimethyl-4,4'-diaminodiphenylsulfone, 3,3'-dimethoxy-4,4'-diaminodiphenylsulfone, 3,3'-diethoxy-4,4'-diaminodiphenylsulfone, 3,3'-difluoro-4,4'-diaminodiphenylsulfone, 3,3'-dichloro-4,4'-diaminodiphenylsulfone, 3,3'-dibromo-4,4'-diaminodiphenylsulfone, 3,3'-di(trifluoromethyl)-4,4'-diaminodiphenylsulfone, 3,3'-dimethyl-4,4'-diaminodiphenylpropane, 3,3'-dimethoxy-4,4'-diaminodiphenylpropane, 3,3'-diethoxy-4,4'-diaminodiphenylpropane, 3,3'-difluoro-4,4'-diaminodiphenylpropane, 3,3'-dichloro-4,4'-diaminodiphenylpropane, 3,3'-dibromo-4,4'-diaminodiphenylpropane, 3,3'-di(trifluoromethyl)-4,4'-diaminodiphenylpropane, 3,3'-dimethyl-4,4'-diaminodiphenyl sulfide, 3,3'-dimethoxy-4,4'-diaminodiphenyl sulfide, 3,3'-diethoxy-4,4'-diaminodiphenyl sulfide, 3,3'-difluoro-4,4'-diaminodiphenyl sulfide, 3,3'-dichloro-4,4'-diaminodiphenyl sulfide, 3,3'-dibromo-4,4'-diaminodiphenyl sulfide, 3,3'-di(trifluoromethyl)-4,4'-diaminodiphenyl sulfide, 3,3'-dimethyl-4,4'-diaminodiphenylhexafluoropropane, 3,3'-dimethoxy-4,4'-diaminodiphenylhexafluoropropane, 3,3'-diethoxy-4,4'-diaminodiphenylhexafluoropropane, 3,3'-difluoro-4,4'-diaminodiphenylhexafluoropropane, 3,3'-dichloro-4,4'-diaminodiphenylhexafluoropropane, 3,3'-dibromo-4,4'-diaminodiphenylhexafluoropropane, 3,3'-di(trifluoromethyl)-4,4'-diaminodiphenylhexafluoroprone, 3,3'-dimethyl-4,4'-diaminobenzophenone, 3,3'-dimethoxy-4,4'-diaminobenzophenone, 3,3'-diethoxy-4,4'-diaminobenzophenone, 3,3'-difluoro-4,4'-diaminobenzophenone, 3,3'-dichloro-4,4'-diaminobenzophenone, 3,3'-dibromo-4,4'-diaminobenzophenone, 3,3'-di(trifluoromethyl)-4,4'-diaminobenzophenone, 3,3'-dimethylbenzidine, 3,3',5,5'-tetramethyl-4,4'-diaminodiphenylmethane, 3,3',5,5'-tetraisopropyl-4,4'-diaminodiphenylmethane, 3,3',5,5'-tetramethoxy-4,4'-diaminodiphenylmethane, 3,3',5,5'-tetraethoxy-4,4'-diaminodiphenylmethane, 3,3',5,5'-tetrafluoro-4,4'-diaminodiphenylmethane, 3,3',5,5'-tetrachloro-4,4'-diaminodiphenylmethane, 3,3',5,5'-tetrabromo-4,4'-diaminodiphenylmethane, 3,3',5,5'-tetra(trifluoromethyl)-4,4'-diaminodiphenylmethane, 3,3',5,5'-tetramethyl-4,4'-diaminodiphenyl ether, 3,3',5,5'-tetraethyl-4,4'-diaminodiphenyl ether, 3,3',5,5'-tetramethoxy-4,4'-diaminodiphenyl ether, 3,3',5,5'-tetraethoxy-4,4'-diaminodiphenyl ether, 3,3',5,5'-tetrafluoro-4,4'-diaminodiphenyl ether, 3,3',5,5'-tetrachloro-4,4'-diaminodiphenyl ether, 3,3',5,5'-tetrabromo-4,4'-diaminodiphenyl ether, 3,3',5,5'-tetra(trifluoromethyl)-4,4'-diaminodiphenyl ether, 3,3',5,5'-tetramethyl-4,4'-diaminodiphenylsulfone, 3,3',5,5'-tetramethoxy-4,4'-diaminodiphenylsulfone, 3,3',5,5'-tetraethoxy-4,4'-diaminodiphenylsulfone, 3,3',5,5'-tetrafluoro-4,4'-diaminodiphenylsulfone, 3,3',5,5'-tetrachloro-4,4'-diaminodiphenylsulfone, 3,3',5,5'-tetrabromo-4,4'-diaminodiphenylsulfone, 3,3',5,5'-tetra(trifluoromethyl)-4,4'-diaminodiphenylsulfone, 3,3',5,5'-tetramethyl-4,4'-diaminodiphenylpropane, 3,3',5,5'-tetramethoxy-4,4'-diaminodiphenylpropane, 3,3',5,5'-tetraethoxy-4,4'-diaminodiphenylpropane, 3,3',5,5'-tetrafluoro-4,4'-diaminodiphenylpropane, 3,3',5,5'-tetrachloro-4,4'-diaminodiphenylpropane, 3,3',5,5'-tetrabromo-4,4'-diaminodiphenylpropane, 3,3',5,5'-tetra(trifluoromethyl)-4,4'-diaminodiphenylpropane, 3,3',5,5'-tetramethyl-4,4'-diaminodiphenyl sulfide, 3,3',5,5'-tetramethoxy-4,4'-diaminodiphenyl sulfide, 3,3',5,5'-tetraethoxy-4,4'-diaminodiphenyl sulfide, 3,3',5,5'-tetrafluoro-4,4'-diaminodiphenyl sulfide, 3,3',5,5'-tetrachloro-4,4'-diaminodiphenyl sulfide, 3,3',5,5'-tetrabromo-4,4'-diaminodiphenyl sulfide, 3,3',5,5'-tetra(trifluoromethyl)-4,4'-diaminodiphenyl sulfide, 3,3',5,5'-tetramethyl-4,4'-diaminodiphenylhexafluoropropane, 3,3',5,5'-tetramethoxy-4,4'-diaminodiphenylhexafluoropropane, 3,3',5,5'-tetraethoxy-4,4'-diaminodiphenylhexafluoropropane, 3,3',5,5'-tetrafluoro-4,4'-diaminodiphenylhexafluoropropane, 3,3',5,5'-tetrachloro-4,4'-diaminodiphenylhexafluoropropane, 3,3',5,5'-tetrabromo- 4,4'-diaminodiphenylhexafluoropropane, 3,3',5,5'-tetra(trifluoromethyl)-4,4'-diaminodiphenylhexafluoropropane, 3,3',5,5'-tetramethyl-4,4'-diaminobenzophenone, 3,3',5,5'-tetramethoxy-4,4'-diaminobenzophenone, 3,3',5,5'-tetraethoxy-4,4'-diaminobenzophenone, 3,3',5,5'-tetrafluoro-4,4'-diaminobenzophenone, 3,3',5,5'-tetrachloro-4,4'-diaminobenzophenone, 3,3',5,5'-tetrabromo-4,4'-diaminobenzophenone, 3,3',5,5'-tetra(trifluoromethyl)-4,4'-diaminobenzophenone, 3,3',5,5'-tetraisopropyl-4,4'-diaminodiphenylmethane, 3,3'-diisopropyl-5,5'-dimethyl-4,4'-diaminodiphenylmethane, 3,3'-diisopropyl-5,5'-diethyl-4,4'-diaminodiphenylmethane, 3,3'-diisopropyl-5,5'-dimethyl-4,4'-diaminodiphenyl ether, 3,3'-diisopropyl-5,5'-diethyl-4,4'-diaminodiphenyl ether, 3,3'-diisopropyl-5,5'-dimethyl-4,4'-diaminodiphenylpropane, 3,3'-diisopropyl-5,5'-diethyl-4,4'-diaminodiphenylpropane, 3,3'-diisopropyl-5,5'-dimethyl-4,4'-diaminodiphenylsulfone, and 3,3'-diisopropyl-5,5'-diethyl-4,4'-diaminodiphenylsulfone.

These aromatic diamines may be used in combination of two or more.

The specific aromatic diamines other than those represented by the formula (X) include m-xylenediamine, 2,4-diaminotoluene, 2,6-diaminotoluene, etc.

Said specific aromatic diamine is used in an amount of 0.5 mol % or more based on the total amounts of the diamines. If its amount is less than 0.5 mol %, there takes place gelation during the synthesis of polyimide or the precursor thereof using a hexacarboxylic acid trianhydride, making it unable to obtain a homogeneous varnish.

The preparation method of polyimide or the precursor thereof where a hexacarboxylic acid trianhydride is used is the same as described above, but when the amount of said specific aromatic diamine is 0.5 to 50 mol %, especially 0.5 to 40 mol %, based on the total amount the diamines, it is preferred to initially react a tetracarboxylic acid dianhydride and a diamine other than said specific aromatic diamine, then add and react said specific aromatic diamine and finally react the acid trianhydride. When the amount of said specific aromatic diamine is 0.5 to 50 mol % based on the total amount of the diamines, it needs to use religious care for preventing gelation in the course of reaction, but according to the above-described method, it is possible to easily accomplish the reaction with no fear of causing gelation.

Said specific aromatic diamine can be used as a diamine which may be used in combination with a fluorine-containing aromatic diamine of the formula (III) in the preparation of polyimide or the precursor thereof, even when no acid trianhydride is used as part of the acid anhydride.

The polyimides or precursors thereof according to the present invention can be used as a varnish by dissolving said resins in an organic solvent or as a powder. The polyamide-acids and the polyimide precursors with a low degree of imidization are soluble in organic solvents and can be used as a varnish, but the polyimides are divided into two types, that is, the type soluble in organic solvents and the type scarcely or sparingly soluble in organic solvents. The latter type is preferably used as a powder.

For preventing formation of the voids caused by generation of the condensate which occurs concomitant with the imidization reaction, it is advisable to use a polyimide which has been almost completed in imidization.

The varnish of a polyimide or a precursor thereof according to this invention may be applied to the surface of a substrate such as glass, silicone wafer, etc., by a usually used method such as spin coating, spraying, brush coating, etc., and then heated to form a polyimide coating film. In case of using a polyimide precursor, imidization is effected in the course of heat treatment.

It is also possible to obtain a film by cast coating a varnish of polyimide or a precursor thereof onto a glass plate, stainless steel plate or the like, drying the coat to remove the solvent and peeling the film from said plate. This film can be used as an adhesive.

Said polyimide coating film can be easily subjected to through-hole forming and other works with an etchant usually used for working of polyimides or a precursor thereof, such as hydrazine, tetramethyl-ammonium hydroxide and the like.

The polyamide-acids according to this invention are preferably the ones which have a reduced viscosity of 0.1 dl/g or above when dissolved in N,N-dimethylformamide in a concentration of 0.1 g/dl and measured at 30° C.

Also, the polyimides of this invention can be easily adjusted in their glass transition temperature within the range of 150° to 300° C., and their thermal decomposition temperature can be adjusted to the order of 350° C or higher. Further, it is possible to reduce water absorptivity of said polyimides to less than 1%, especially less than 0.5%.

The present invention will be further described below with reference to the examples thereof. The 5-(perfluorononenyloxy)isophthalic acid used in the following examples is a compound having the following structural formula:

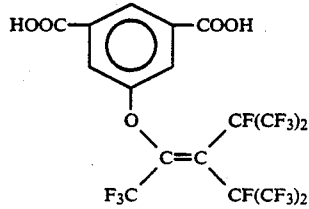

EXAMPLE 1

0.61 g (1.0 mmol) of 5-(perfluorononenyloxy)isophthalic acid, 0.66 g (2.4 mmol) of diphenylphosphorylazide and 0.24 g (2.4 mmol) of triethylamine were reacted in 10 ml of t-butanol at the reflux temperature for 20 hours. After the reaction, t-butanol was evaporated away and the residue was added with ether and washed with dilute hydrochloric acid and an aqueous sodium hydrogencarbonate solution. Then the ether was evaporated away and the residue was recrystallized from hexane to obtain the objective product 1,3-bis-[N-(t-butyloxycarbonyl)amino]-5-perfluorononenyloxybenzene in a yield of 86%.

The properties and the result of an elemental analysis of the obtained compound are shown below.

(1) Melting point: 69°–71° C.

(2) $^1$H-NMR spectrum (solvent: acetone-$d_6$, TMS standard): 8.72 ppm (2H, NH, s), 7.61 ppm (1H, aromatic, t), 7.09 ppm (2H, aromatic, s), 1.49 ppm (9H, t-Bu, t).

(The three terms in the parentheses indicate integral intensity ratio of hydrogen, the group serving as the base of absorption and the type of the peak, respectively. s: singlet, t: triplet).

(3) $^{19}$F-NMR spectrum (solvent: acetone-$d_6$, trifluorotoluene standard): 11.32 ppm (3F, $CF_3$, d), −3.54 ppm (6F, $CF_3$, s), −4.82 ppm (6F, $CF_3$, d), −99.70 ppm (1F, CF, quart.), −101.49 ppm (1F, CF, quint.).

(The three terms in the parentheses indicate integral intensity ratio of fluorine, the group serving as the base of absorption and the type of peak, respectively. s: singlet; d: doublet; quart.: quartet; quint.: quintet).

(4) IR absorption spectrum: 3336 cm$^{-1}$ (N-H, urethane), 1710 cm$^{-1}$ (C-F).

(5) Elemental analysis

|  | C | H | N | F | O (balance) |
|---|---|---|---|---|---|
| Calculated (%): | 39.8 | 3.1 | 3.7 | 42.8 | 10.6 |
| Found (%): | 39.6 | 3.0 | 3.7 | 42.9 | 10.8 |

The above data have confirmed formation of the objective compound. This compound had the following structural formula:

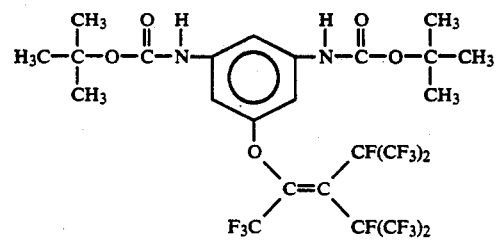

EXAMPLE 2

4.0 ml of 4N sodium hydrogencarbonate/methanol was added to 0.200 g (0.265 mmol) of 1,2-bis[N-(t-butyloxycarbonyl)amino]-5-(perfluorononenyloxy)benzene obtained in Example 1, and the mixture was stirred at room temperature for 4 hours. Then the methanol was evaporated away and the residue was extracted with ether. After washing the ether extract with water, the ether was evaporated away and the residue was column chromatographed with ether/hexane to obtain the objective compound 1,3-diamino-5-(perfluorononenyloxy)benzene in a yield of 65%.

The analytical data of the obtained compound are shown below.

(1) Melting point: 105.5°–106.9° C.

(2) $^1$H-NMR spectrum (acetone-$d_6$, TMS standard): 5.87 (1H, aromatic, t), 5.63 (2H, aromatic, t), 4.75 (4H, $NH_2$, s).

(3) $^{19}$F-NMR spectrum (acetone-$d_6$, trifluorotoluene standard): 11.03 (3F, $CF_3$, d), −3.68 (6F, $CF_3$, s), −4.98 (6F, $CF_3$, d), −99.71 (1F, CF, quart.), −101.67 (1F, CF, quint.).

(4) IR absorption spectrum: 3452 cm$^{-1}$, 3380 cm$^{-1}$, 1628 cm$^{-1}$ (N-H, amine), 1298 cm$^{-1}$, 1238 cm$^{-1}$, 1190 cm$^{-1}$ (C-F).

(5) Elemental analysis

|  | C | H | N | F | O (balance) |
|---|---|---|---|---|---|
| Calculated (%): | 32.5 | 1.3 | 5.0 | 58.4 | 2.9 |
| Found (%): | 32.5 | 1.2 | 5.0 | 58.4 | 2.9 |

The obtained substance was determined to be the objective compound from the above data. This compound had the following structural formula:

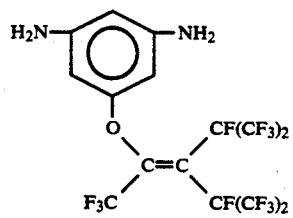
(a)

EXAMPLE 3

8 g of dried N,N-dimethylacetamide and 1.1 g (2 mmol) of 1,3-diamino-5-(perfluorononenyloxy)benzene (having the structural formula (a)) were supplied into and stirred in a four-necked flask equipped with a thermometer, a stirrer, a drying pipe and a nitrogen feed pipe. After the diamine was dissolved, 0.89 g (2 mmol) of 2,2-bis(3,4-dicarboxyphenyl)hexafluoropropane dianhydride was added piecemeal into the solution under cooling with an ice bath. This was followed by 5-hour reaction under ice-bath cooling to obtain a polyamide-acid solution.

This polyamide-acid solution was put into water or methanol, and the precipitated polyamide-acid was filtered out and dried. An IR absorption spectrum of this polyamide-acid is shown in FIG. 1. In a separate operation, said polyamide-acid was dissolved in N,N-dimethylacetamide to a concentration of 0.1 g/dl and the reduced viscosity of the solution was measured at 30° C. The results are shown in Table 1.

Figure 2:
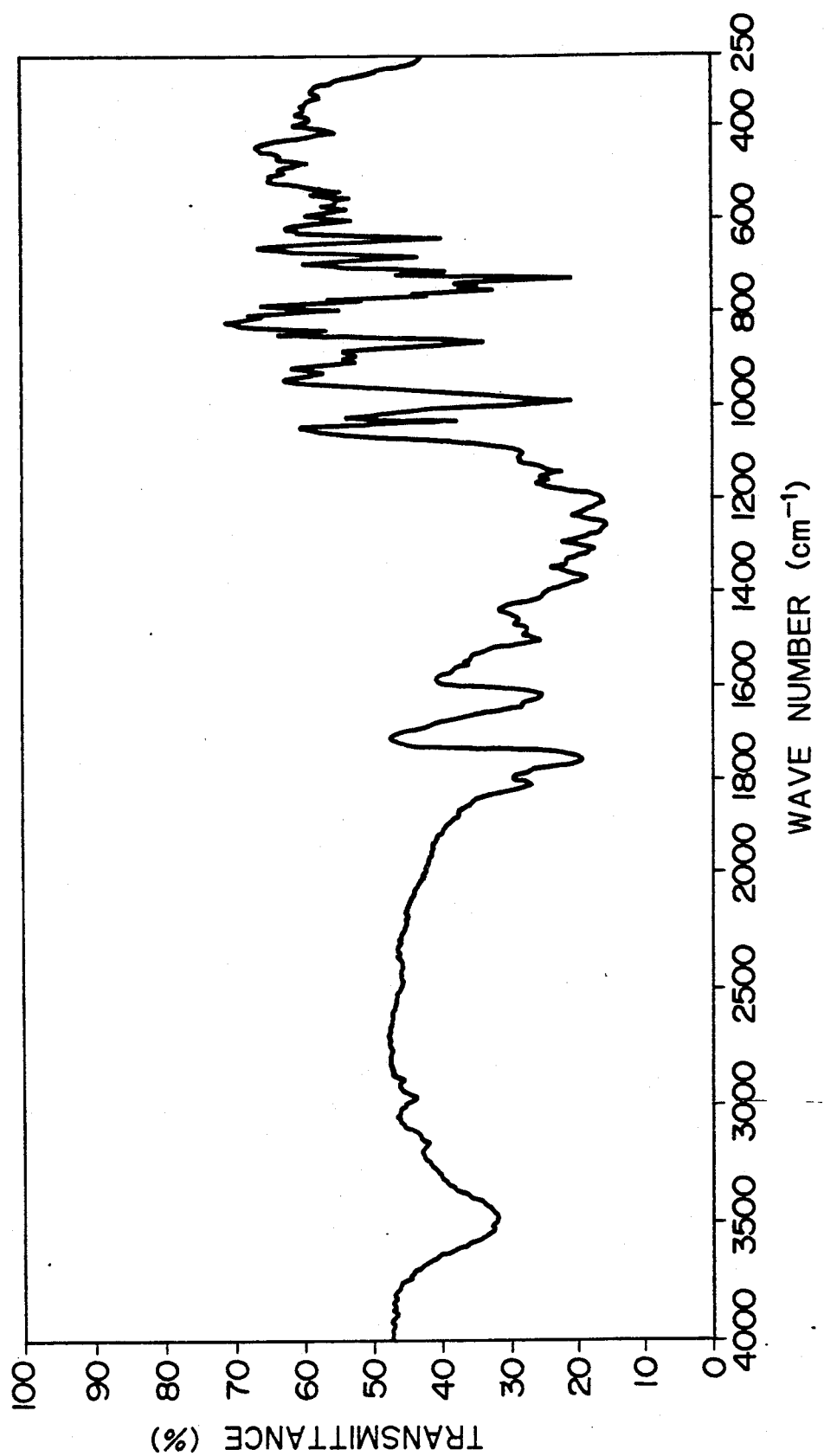
FIG. 2 is an IR spectrum of the polyimide obtained in Example 3.

Further, said polyamide-acid solution was spin-coated on a glass substrate and heated at 150° C., 200° C., 250° C. and 300° C. successively for 30 minutes at each temperature to obtain a polyimide coating film. An IR spectrum of the polyimide obtained here is shown in FIG. 2. The results of determination of glass transition temperature, thermal decomposition temperature, water absorptivity and dielectric constant of the obtained polyimide are shown in Table 1.

Repeating unit of the polyimide obtained here:

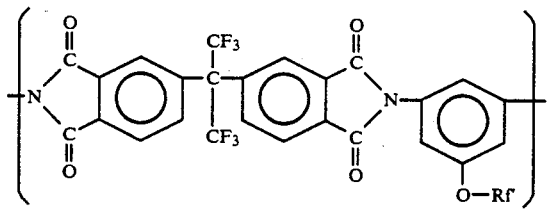

Repeating unit of the polyamide-acid obtained here:

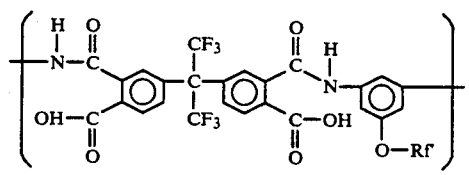

Rf' = the group of the formula (A).

EXAMPLE 4

Figure 3:
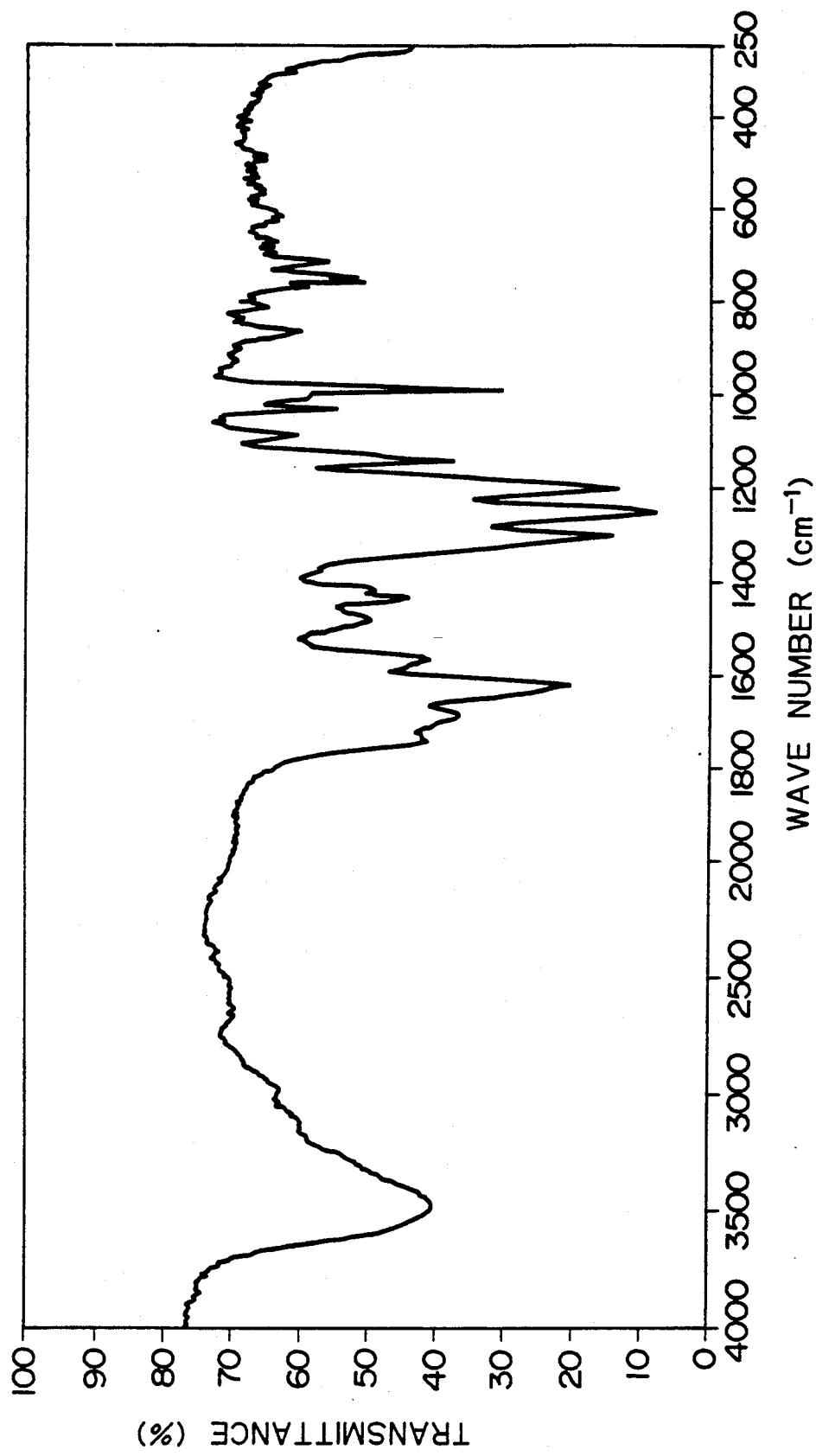
FIG. 3 is an IR spectrum of the polyamide-acid obtained in Example 4.
Figure 4:
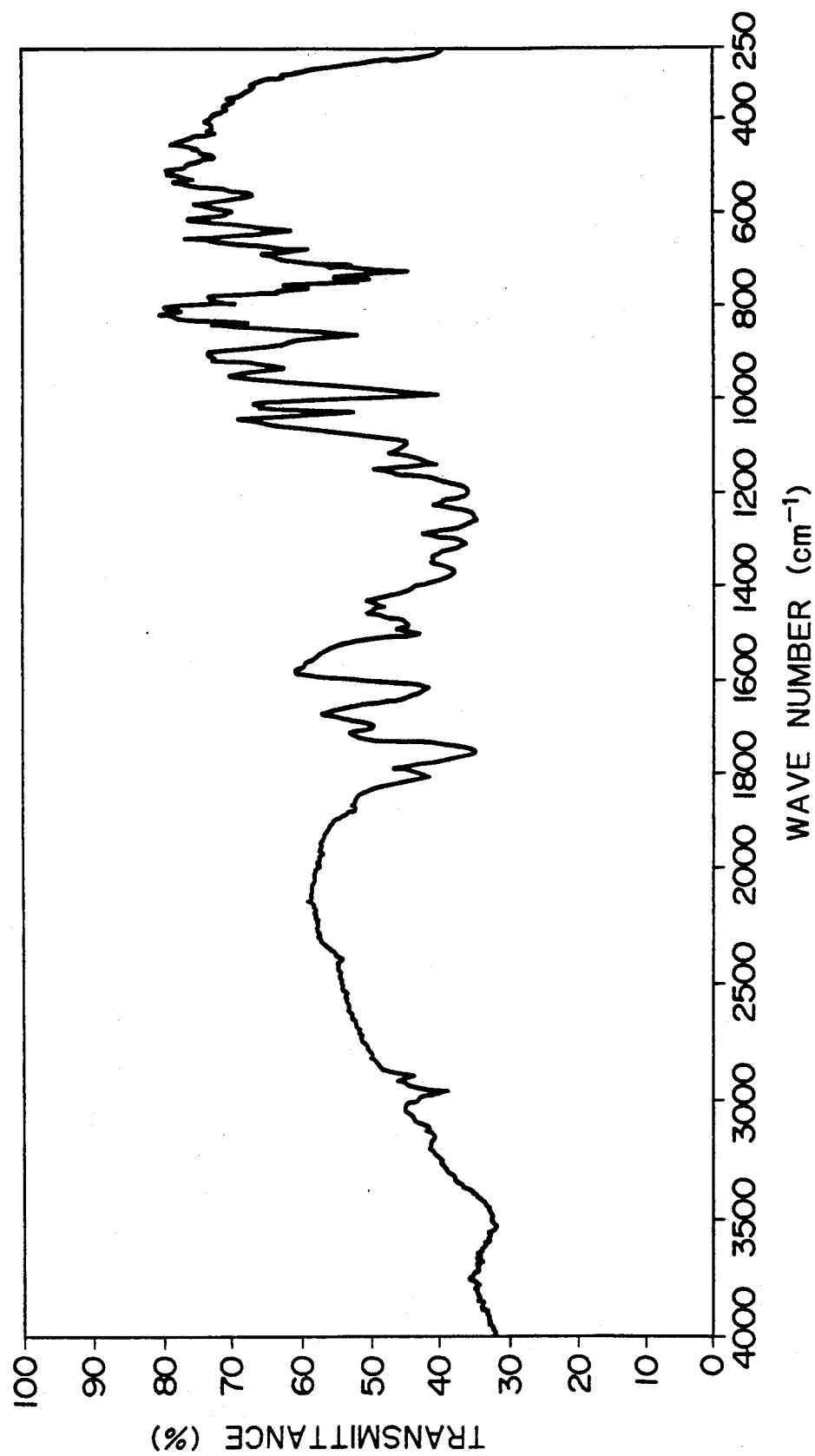
FIG. 4 is an IR spectrum of the polyimide obtained in Example 4.

Into a four-necked flask equipped with a thermometer, a stirrer, a drying pipe and a nitrogen feed pipe, 8 g of N-methyl-2-pyrrolidone was supplied, followed by additional supply of 1.1 g (2 mmol) of 1,3-diamino-5-(perfluorononenyloxy)benzene (having the structural formula (a)) and stirring of the mixture. After the diamine was dissolved, 0.64 g (2 mmol) of 3,4,3',4'-benzophenonetetracarboxylic acid dianhydride was added piecemeal into the solution. After this addition was completed, said materials were allowed to react at room temperature for 5 hours to obtain a polyamide-acid solution. Thereafter, the polyamide-acid was isolated and its IR spectrum and reduced viscosity were determined in the same way as Example 3. Also, a polyimide coating film was formed according to the method of Example 3, and the IR spectrum, glass transition temperature, thermal decomposition temperature and water absorptivity of the obtained polyimide were determined. An IR spectrum of the polyamide-acid obtained here is shown in FIG. 3 and an IR spectrum of the polyimide obtained here is shown in FIG. 4. The results of other determinations are shown in Table 1.

Repeating unit of the polyimide:

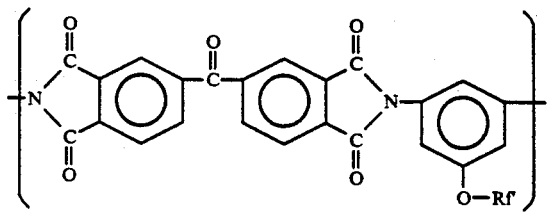

Repeating unit of the polyamide-acid:

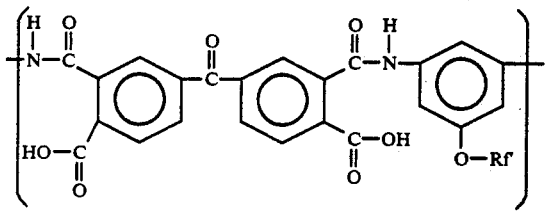

Rf' = the group of the formula (A).

EXAMPLE 5

Figure 5:
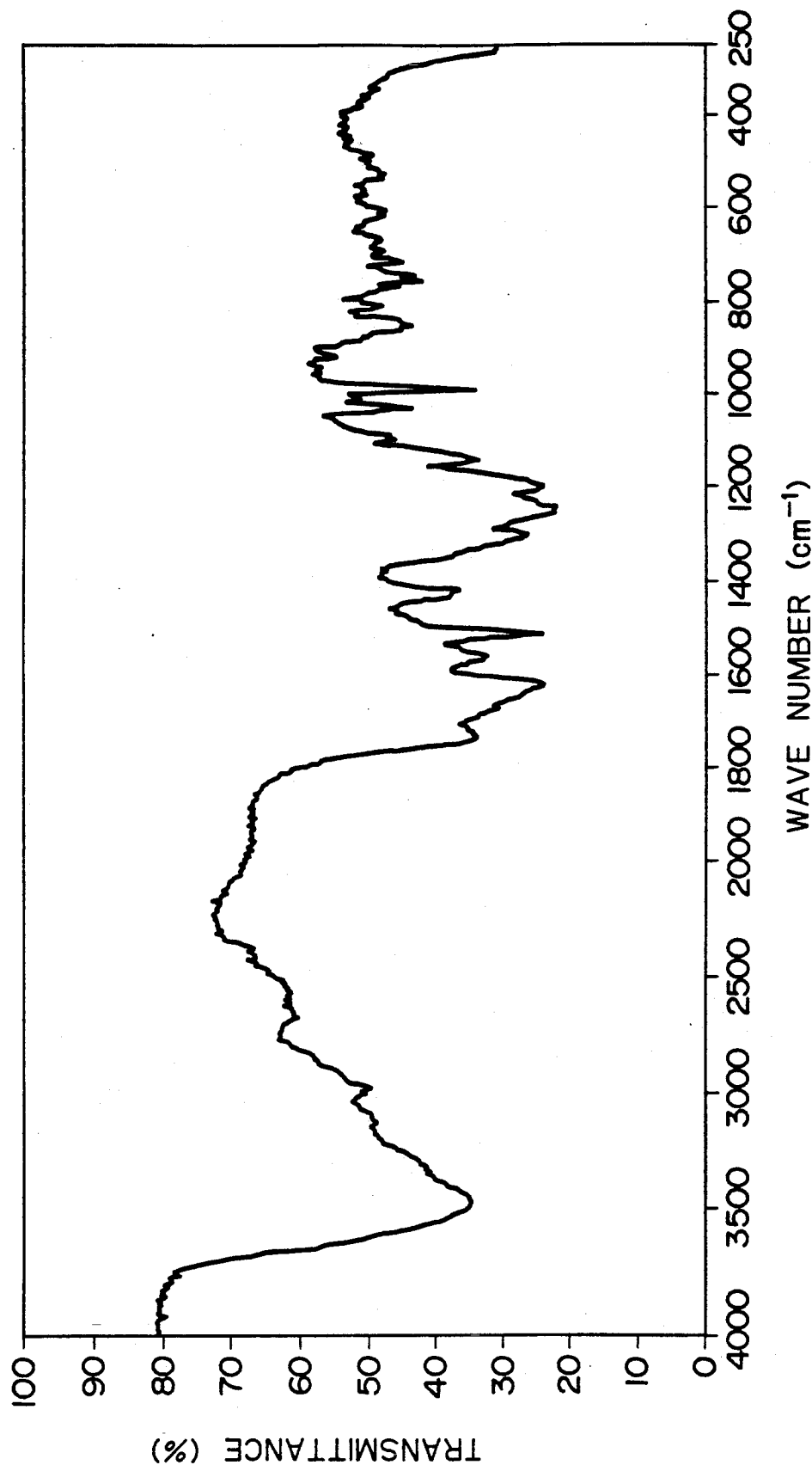
FIG. 5 is an IR spectrum of the polyamide-acid obtained in Example 5.
Figure 6:
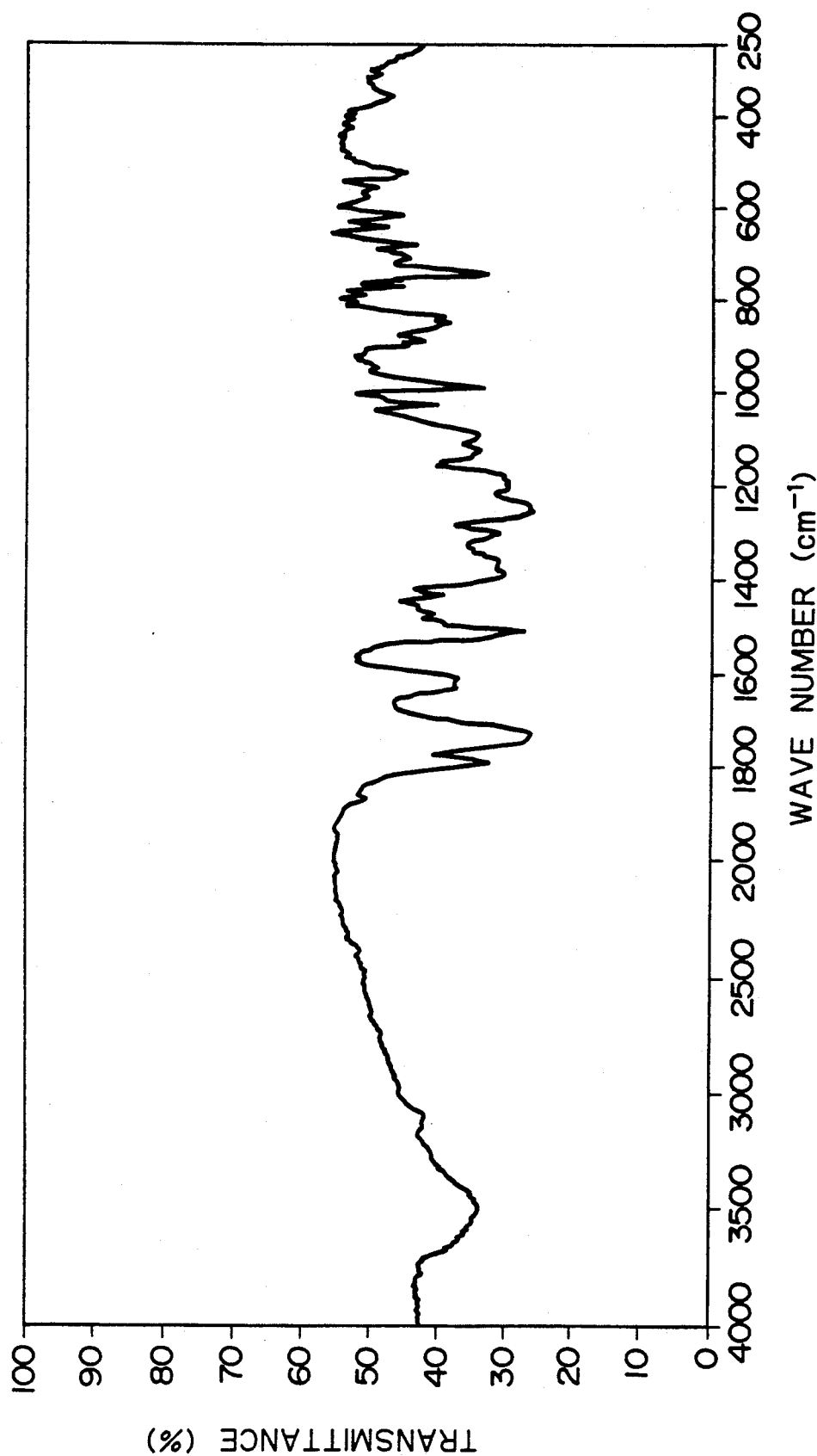
FIG. 6 is an IR spectrum of the polyimide obtained in Example 5.

Into a four-necked flask equipped with a thermometer, a stirrer, a drying pipe and a nitrogen feed pipe, 8 g of N,N-dimethylacetamide was supplied, followed by additional supply of 0.55 g (1 mmol) of 1,3-diamino-5-(perfluorononenyloxy)benzene (having the structural formula (a)) and 0.2 g (1 mmol) of 4,4'-diaminodiphenyl ether, and the supplied materials were mixed and stirred in the flask until a homogeneous solution was formed. Then 0.58 g (2 mmol) of 3,43',4'-diphenyltetracarboxylic acid dianhydride was added piecemeal into the solution at room temperature. After this addition was completed, the materials were allowed to react at room temperature for 5 hours to obtain a polyamide-acid solution. Thereafter, the polyamide-acid was isolated and its IR spectrum and reduced viscosity were determined in the same way as Example 3. Also, a polyimide coating film was formed according to the method of Example 3, and the IR spectrum, glass transition temperature, thermal decomposition temperature and water absorptivity of the obtained polyimide were determined. An IR spectrum of the polyamide-acid is shown in FIG. 5 and an IR spectrum of the polyimide is shown in FIG. 6. The results of other determinations are shown in Table 1.

Repeating units of the polyimide:

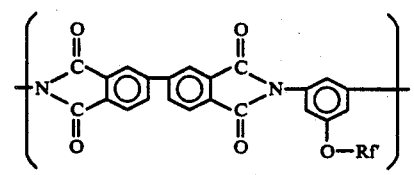

(50 mol %)

and

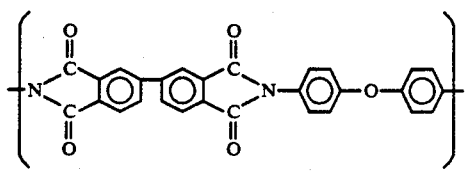

(50 mol %)

Repeating units of the polyamide-acid:

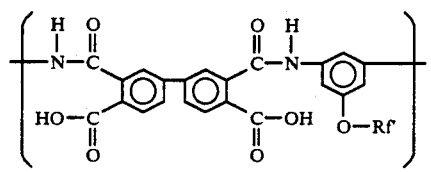

(50 mol %)

and

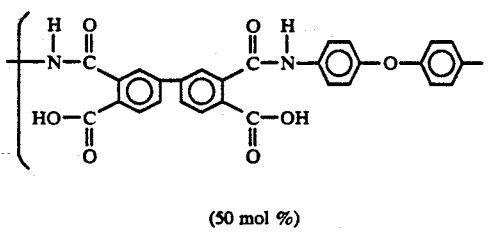

(50 mol %)

Rf' = the group of the formula (A).

EXAMPLE 6

Figure 7:
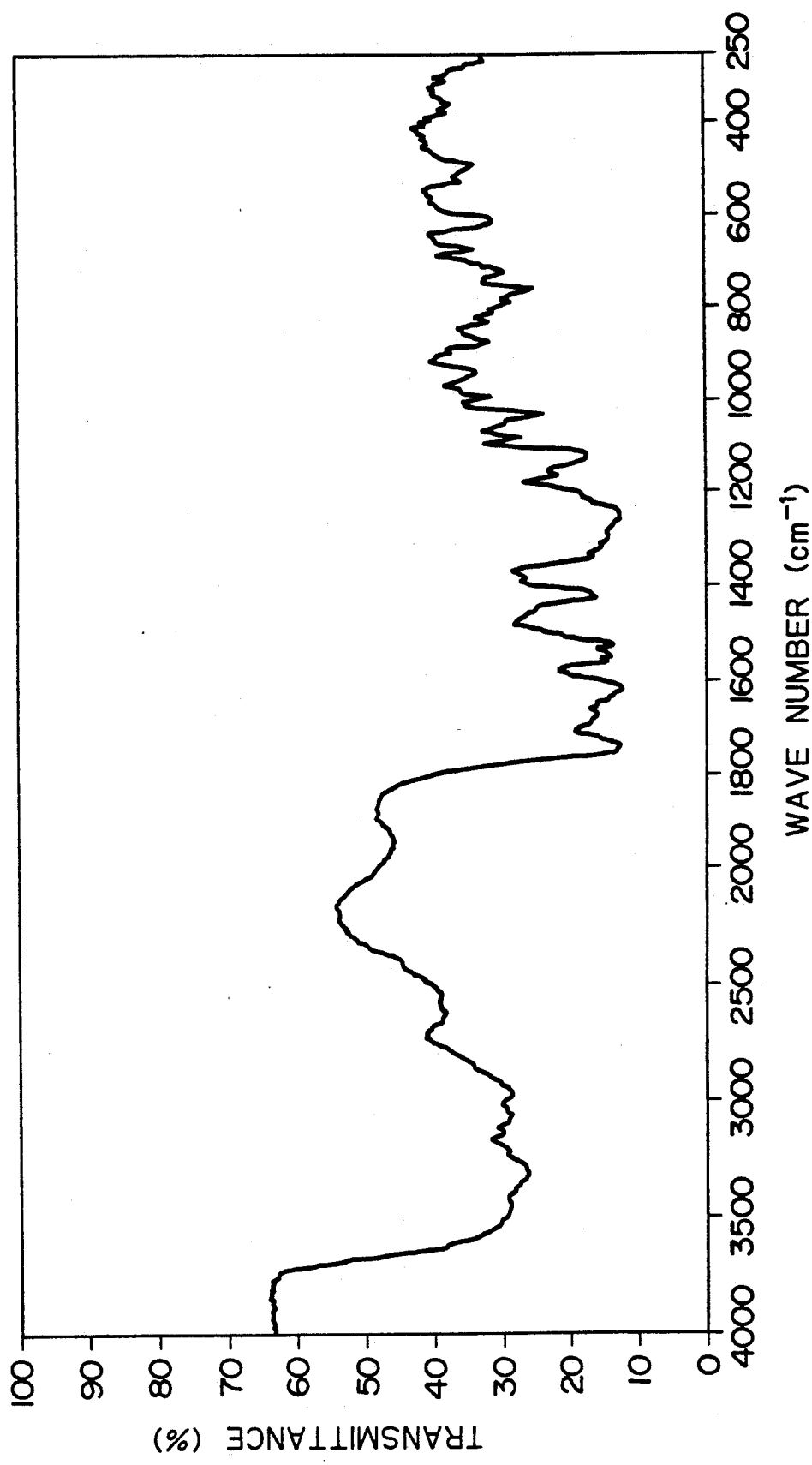
FIG. 7 is an IR spectrum of the polyamide-acid obtained in Example 6.
Figure 8:
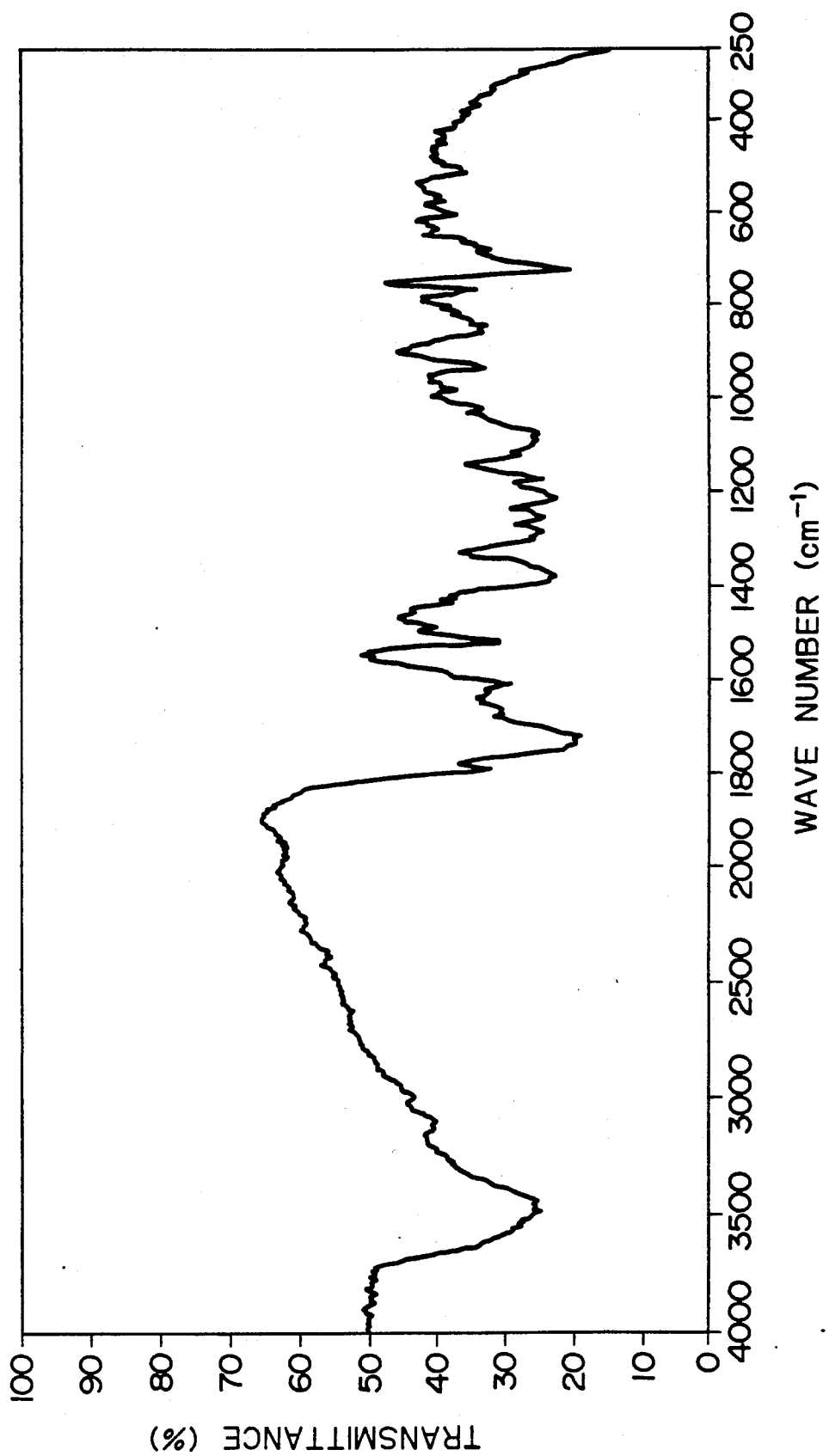
FIG. 8 is an IR spectrum of the polyimide obtained in Example 6.

8 g of N,N-dimethylformamide and then 0.06 g (0.1 mmol) of 1,3-diamino-5-(perfluorononenyloxy)benzene (of the structural formula (a)) and 0.38 g (1.9 mmol) of 4,4'-diaminodiphenylethane were supplied into a four-necked flask equipped with a thermometer, a stirrer, a drying pipe and a nitrogen feed pipe, and stirred until a homogeneous solution was formed. Then 0.82 g (2 mmol) of ethylene glycol bis(trimellitic acid anhydride) was added piecemeal into the solution under cooling with an ice bath. After this addition was completed, the materials were allowed to react at room temperature for 2 hours under ice bath cooling to obtain a polyamide-acid. This polyamide-acid was isolated and its IR spectrum and reduced viscosity were determined in the same way as Example 3. Further, a polyimide coating film was formed according to the method used in Example 1, and the IR spectrum, glass transition temperature, thermal decomposition temperature and water absorptivity of the polyimide were determined. An IR spectrum of the polyamide-acid is shown in FIG. 7 and an IR spectrum of the polyimide is shown in FIG. 8. The results of other determinations are shown in Table 1.

Repeating units of the polyimide:

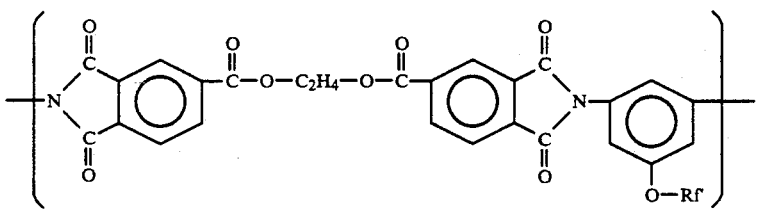

(5 mol %)

and

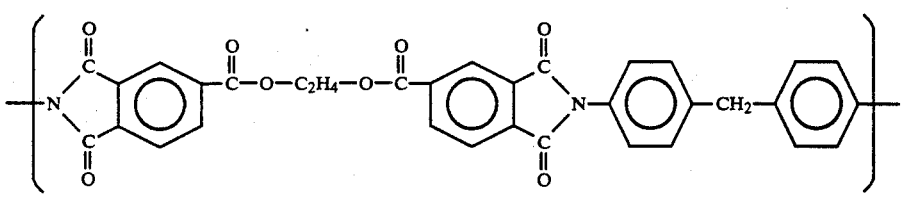

(95 mol %)

Repeating units of the polyamide-acid:

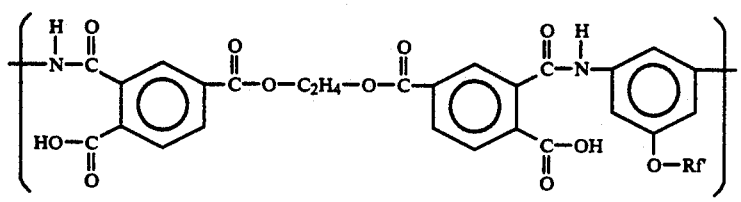

(5 mol %)

and

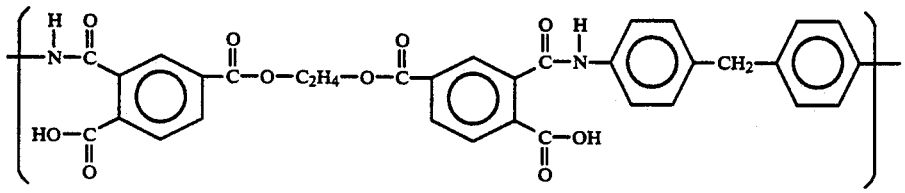

(95 mol %)

(Rf' represents the group of the formula (A)).

EXAMPLE 7

Figure 9:
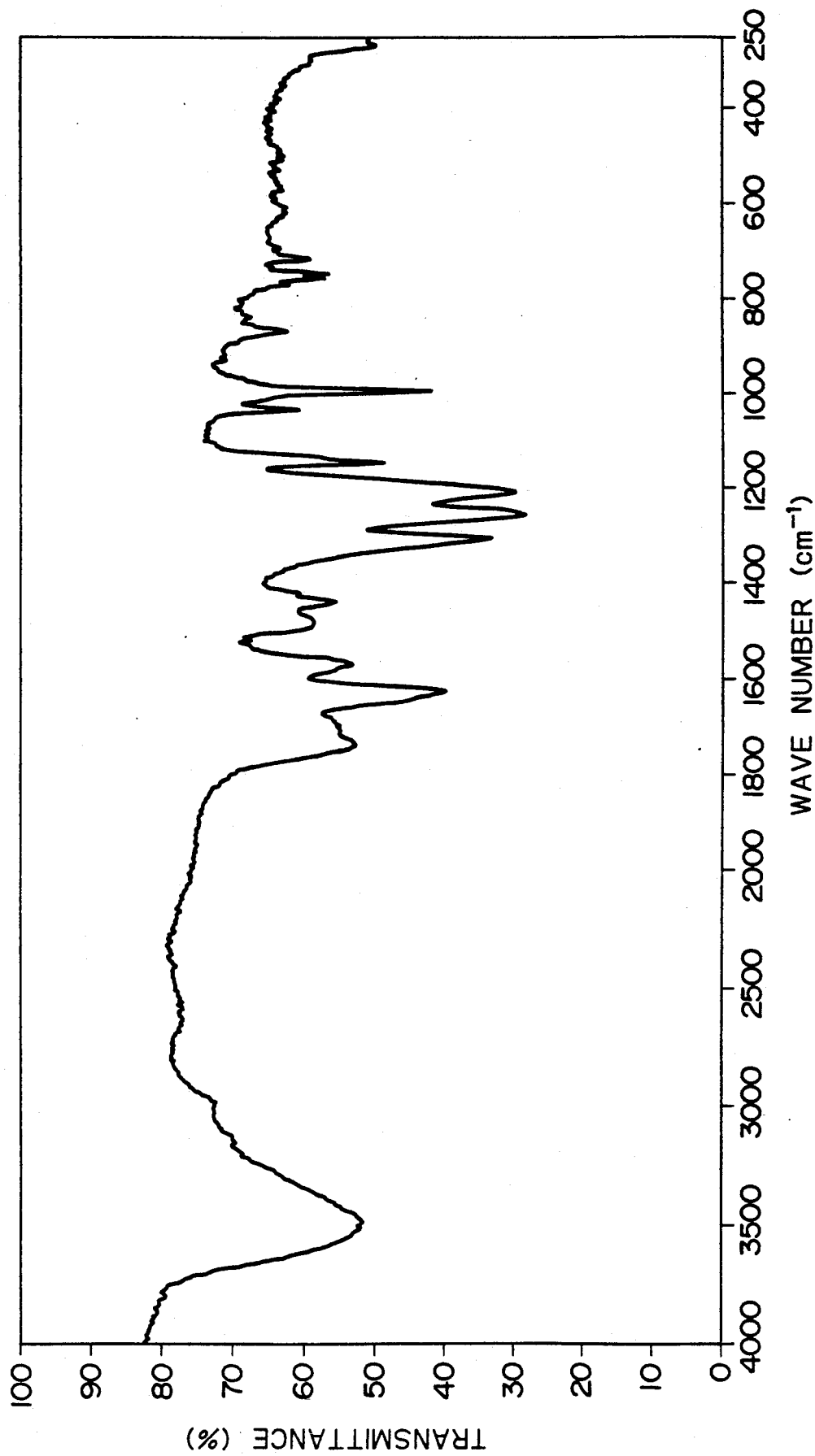
FIG. 9 is an IR spectrum of the polyamide-acid obtained in Example 7.
Figure 10:
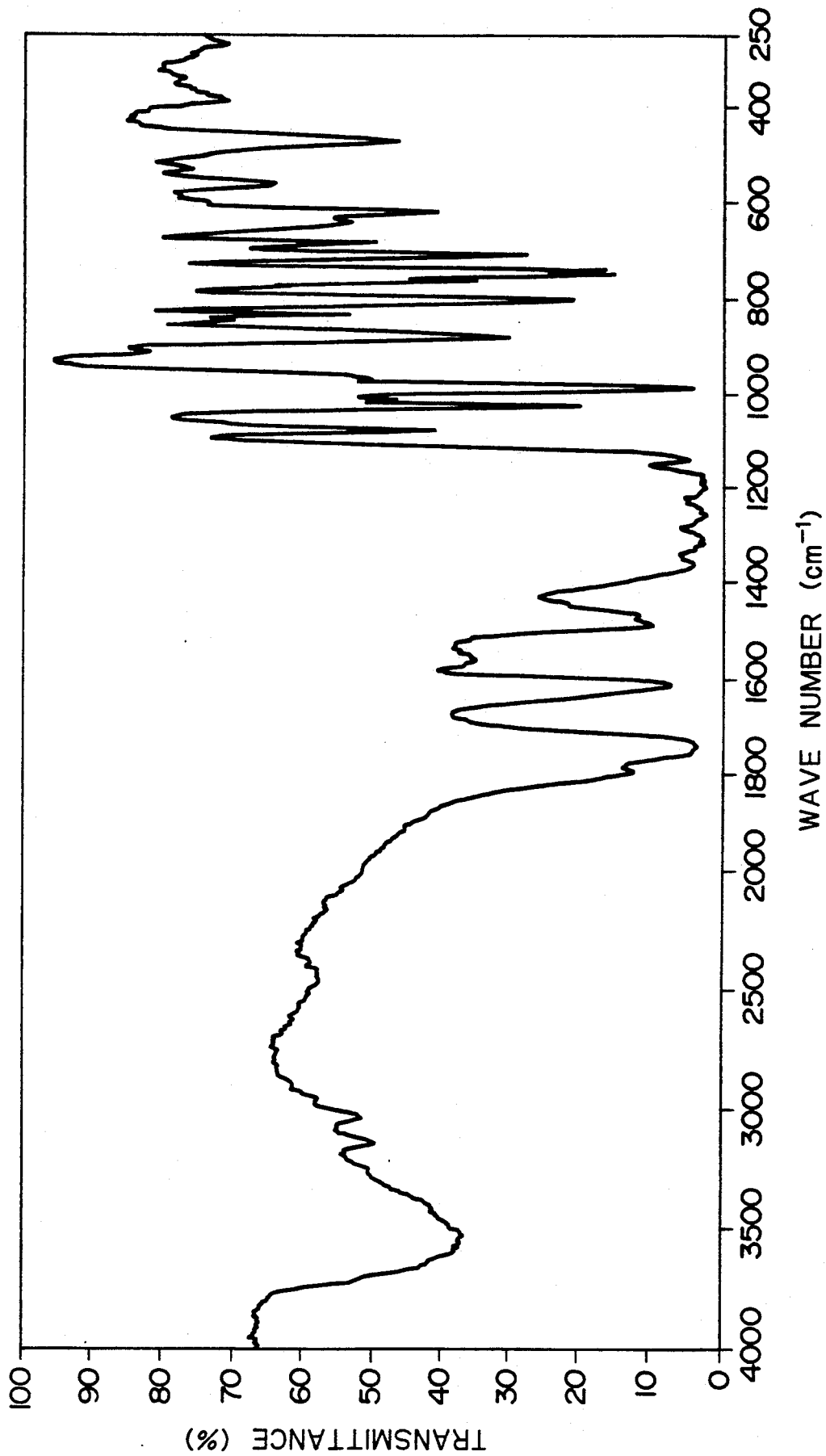
FIG. 10 is an IR spectrum of the polyimide obtained in Example 7.

8 g of N,N-dimethylacetamide and 1.1 g (2 mmol) of 1,3-diamino-5-(perfluorononenyloxy)benzene (having the structural formula (a)) were supplied into and stirred in a four-necked flask equipped with a thermometer, a stirrer, a drying pipe and a nitrogen feed pipe. After the diamine was dissolved, 0.392 g (2 mmol) of 1,2,3,4-cyclobutanetetracarboxylic acid anhydride was added piece-meal into the solution under cooling with an ice bath. Thereafter, the materials were subjected to 5-hour reaction under ice bath cooling to form a polyamide-acid solution. Then the polyamide-acid was isolated and its IR spectrum and reduced viscosity were determined in the same way as Example 3. Further, a polyimide coating film was formed according to the method of Example 3, and IR spectrum, glass transition temperature, thermal decomposition temperature and water absorptivity of the polyimide were determined. An IR spectrum of the polyamide-acid is shown in FIG. 9 and an IR spectrum of the polyimide is shown in FIG. 10. The results of other determinations are shown in Table 1.

Repeating unit of the polyimide:

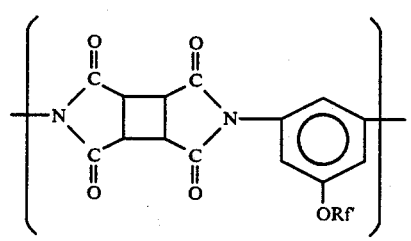

Repeating unit of the polyamide-acid:

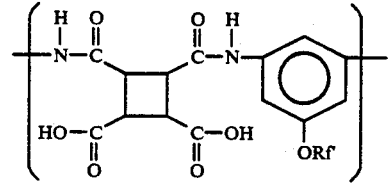

Rf' = the group of the formula (A).

EXAMPLE 8

Figure 11:
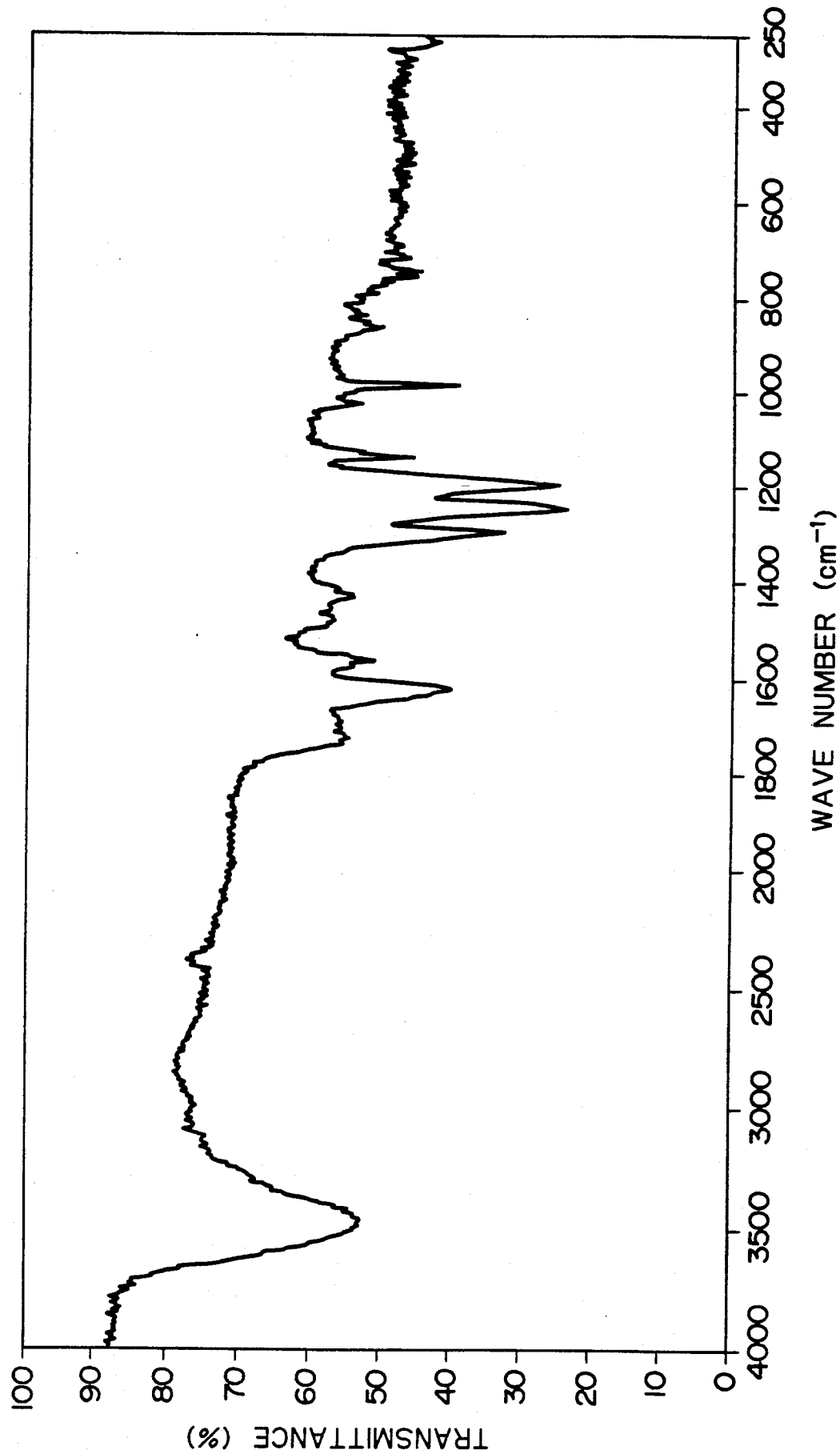
FIG. 11 is an IR spectrum of the polyamide-acid obtained in Example 8.
Figure 12:
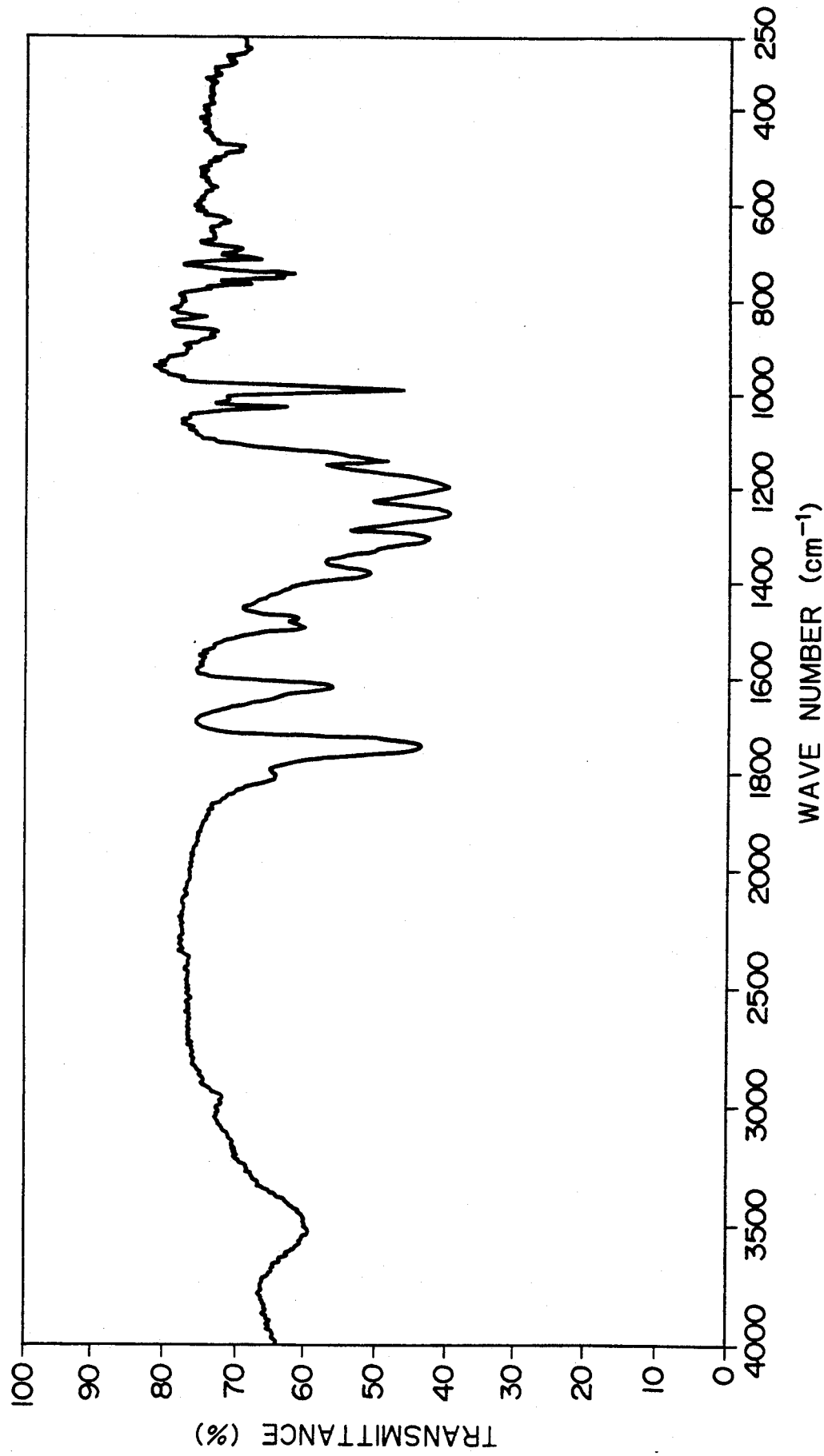
FIG. 12 is an IR spectrum of the polyimide obtained in Example 8.

8 g of N,N-dimethylacetamide and 1.1 g (2 mmol) of 1,3-diamino-5-(perfluorononenyloxy)benzene (having the structural formula (a)) were supplied into and stirred in a four-necked flask equipped with a thermometer, a stirrer, a drying pipe and a nitrogen feed pipe. After the diamine was dissolved, 0.396 g (2 mmol) of butanetetracarboxylic acid dianhydride was added piecemeal into the solution under cooling with an ice bath. After this addition was completed, the materials were reacted for 5 hours under ice bath cooling to form a polyamide-acid solution. Then the polyamide-acid was isolated and its IR spectrum and reduced viscosity were determined in the same way as Example 3. Also, a polyimide coating film was formed according to the method used in Example 3, and IR spectrum, glass transition temperature, thermal decomposition temperature and water absorptivity of the polyimide were determined. An IR spectrum of the polyamide-acid is shown in FIG. 11 and an IR spectrum of the polyimide is shown in FIG. 12. The results of other determinations are shown in Table 1.

Repeating unit of the polyimide:

Repeating unit of the polyamide-acid:

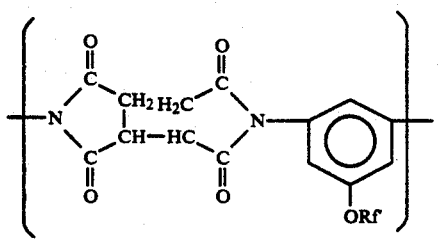

Repeating unit of the polyamide-acid:

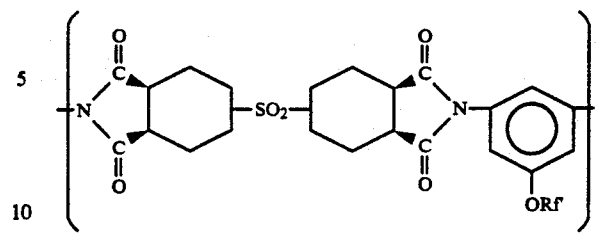

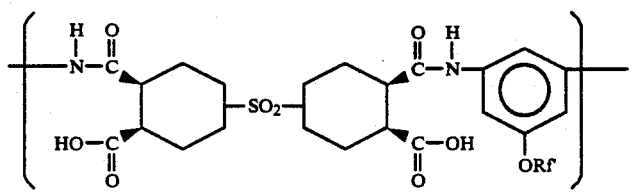

Rf' = the group of the formula (A).

COMPARATIVE EXAMPLE 1

Into a four-necked flask equipped with a thermometer, a stirrer, a drying pipe and a nitrogen feed pipe, 8 g of N,N-dimethylacetamide and 0.4 g (2 mmol) of 4,4'-diaminodiphenyl ether were supplied and stirred until a homogeneous solution was formed. After the diamine was dissolved, 0.89 g (2 mmol) of 2,2-bis(3,4-dicarboxyphenyl)hexafluoropropane dianhydride was added piecemeal into the solution under cooling with an ice bath. After this addition was completed, the mixture was reacted for 5 hours under ice-bath cooling to form a polyamide-acid solution. Then the polyamide-acid was isolated and reduced viscosity was determined by the same method as used in Example 3. Also, a polyimide coating film was formed according to the method of Example 3, and glass transition temperature, thermal decomposition temperature and water absorptivity of the polyimide were determined. The results of determinations are shown in Table 1.

COMPARATIVE EXAMPLE 2

A polyamide-acid was obtained by following the procedure of Comparative Example 1 except that 0.64 g (2 mmol) of benzophenonetetracarboxylic acid dianhydride was used in place of 0.98 g (2 mmol) of 2,2-bis(3,4-dicarboxyphenyl)hexafluoropropane dianhydride. Then the polyamide-acid was isolated and reduced viscosity was determined according to the method of Example 3. Also, a polyimide coating film was formed according to the method of Example 3, and glass transition temperature, thermal decomposition temperature and water absorptivity of the polyimide were determined. The results of determinations are shown in Table 1.

In the above Examples and Comparative Examples, determinations of glass transition temperature, thermal decomposition temperature, water absorptivity and dielectric constant were made under the conditions described below.

1) Glass transition temperature

This was determined with a sample amount of about 10 mg at a heating rate of 10° C./min by using a glass

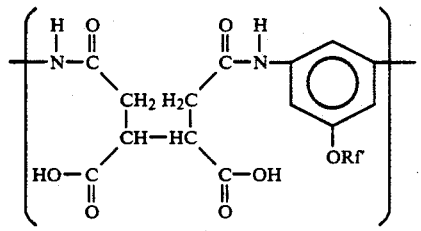

Rf' = the group of the formula (A).

EXAMPLE 9

Figure 13:
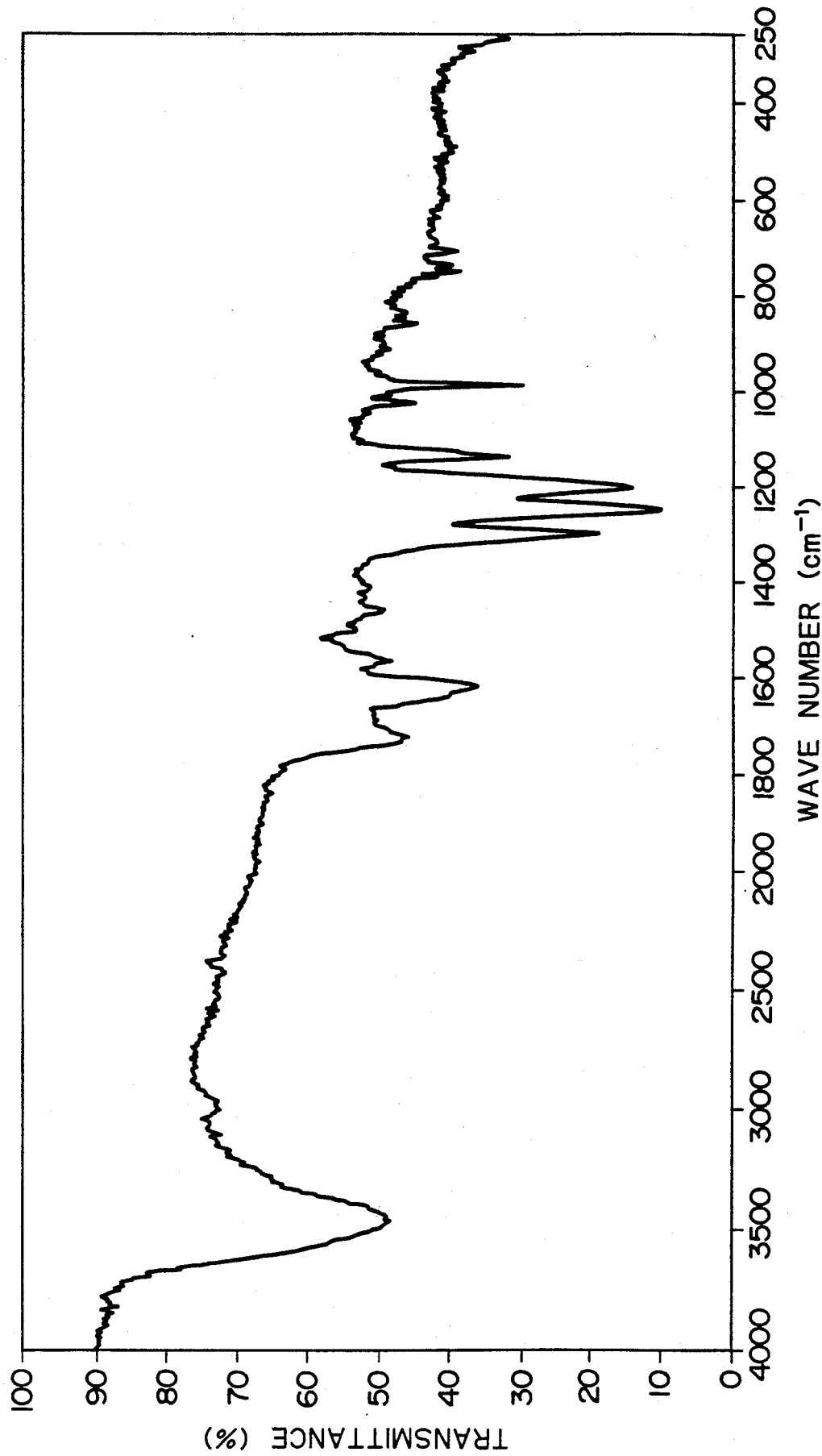
FIG. 13 is an IR spectrum of the polyamide-acid obtained in Example 9.
Figure 14:
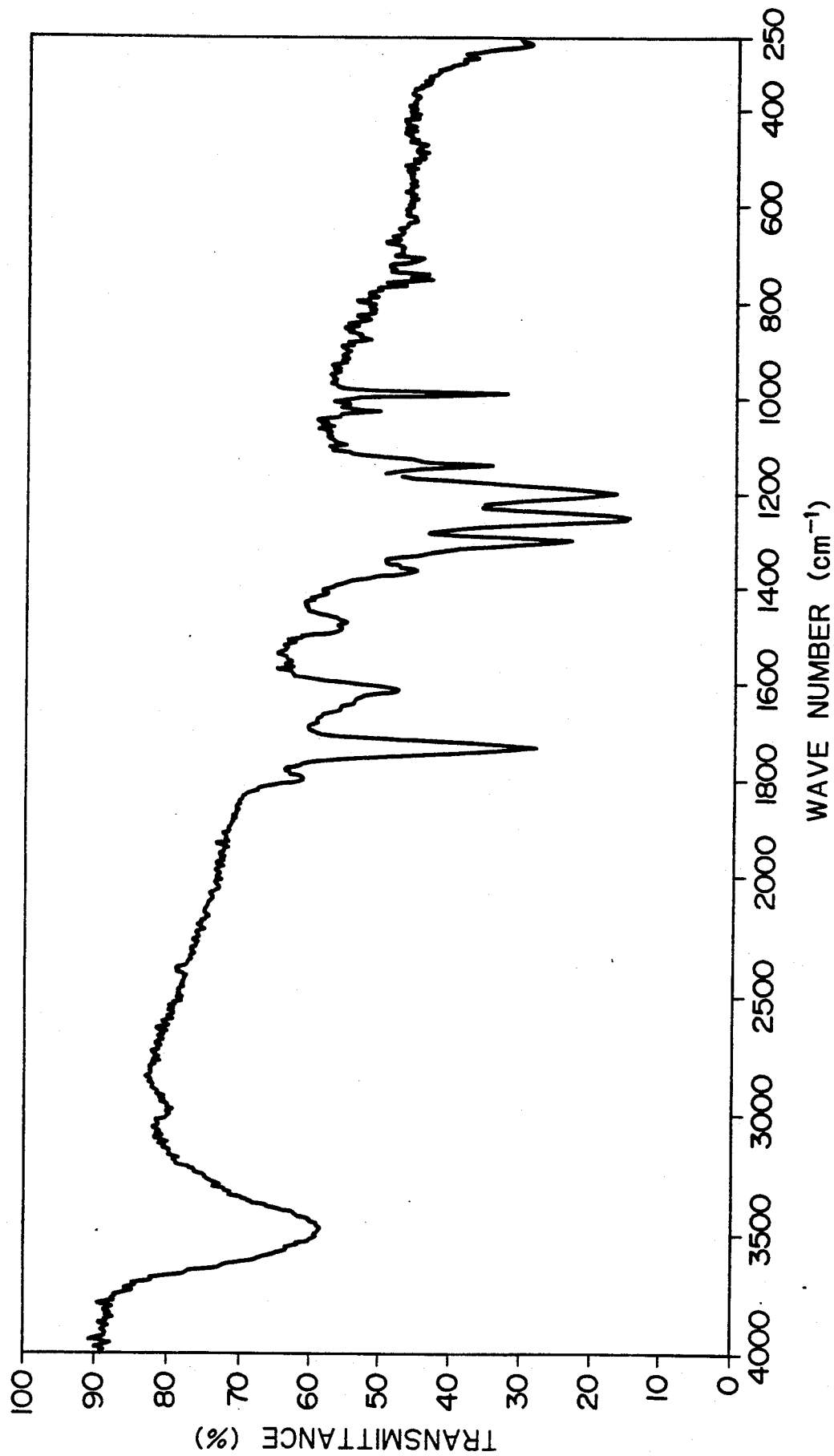
FIG. 14 is an IR spectrum of the polyimide obtained in Example 9.

8 g of N,N-dimethylacetamide and 1.1 g (2 mmol) of 1,3-diamino-5-(perfluorononenyloxy)benzene (having the structural formula (a)) were supplied into and stirred in a four-necked flask equipped with a thermometer, a stirrer, a drying pipe and a nitrogen feed pipe. After the diamine was dissolved, 0.788 g (2 mmol) of bis(exo-bicyclo(2,2,1)heptane-2,3-dicarboxylic acid anhydride)sulfone was added piecemeal into the solution in the flask under cooling in an ice bath. This was followed by 5-hour reaction under ice bath cooling to form a polyamide-acid solution. Then the polyamide-acid was isolated and its IR spectrum and reduced viscosity were determined in the same way as Example 3. Also, a polyimide coating film was formed according to the method of Example 3, and IR spectrum, glass transition temperature, thermal decomposition temperature and water absorptivity of the polyimide were determined. An IR spectrum of the polyamide-acid is shown in FIG. 13 and an IR spectrum of the polyimide is shown in FIG. 14. The results of other determinations are shown in Table 1.

Repeating unit of the polyimide:

transition temperature meter Model DSC-7 mfd. by Perkin Elmer Co., Ltd.

2) Thermal decomposition temperature

This was determined at a heating rate of 10° C./min by using a differential thermobalance (TG-7000 mfd. by Shinku Riko Co., Ltd.)

3) Water absorptivity

Each sample of polyimide film was immersed in water at room temperature for 24 hours, and water absorptivity was determined from the change in weight before and after immersion.

4) Dielectric constant

This was determined by using a dielectric constant meter under the conditions of 10 kHz and room temperature.

results of determinations and the fluorine atom content in the obtained polyimides are shown in Table 2.

The determining conditions were as described below.

1) Solvent resistance

Each polyimide resin coating film was immersed in various solvents at room temperature for 10 minutes and then the appearance of the film was visually observed and evaluated. In the table, ○ mark indicates "no abnormality".

2) Glass transition temperature, thermal decomposition temperature, water absorptivity and dielectric constant were determined in the same ways as described before.

TABLE 1

| | Property evaluations | | | | | | | | |
|---|---|---|---|---|---|---|---|---|---|
| | Example No. | | | | | | | Comp. Example No. | |
| | 3 | 4 | 5 | 6 | 7 | 8 | 9 | 1 | 2 |
| Reduced viscosity of polyamide-acid (dl/g) | 0.17 | 0.20 | 0.43 | 0.38 | 0.10 | 0.14 | 0.08 | 0.55 | 0.63 |
| Glass transition temp. of polyimide (°C.) | 260 | 261 | 273 | 285 | 254 | 244 | 278 | 175 | 293 |
| Thermal decomposition temp. of polyimide (°C.) | 405 | 403 | 415 | 420 | 410 | 405 | 380 | 450 | 463 |
| Water absorptivity of polyimide (%) | 0.2 | 0.3 | 0.2 | 0.4 | 0.2 | 0.2 | 0.3 | 1.1 | 1.3 |
| Dielectric constant of polyimide | 2.6 | 2.8 | 2.9 | 2.8 | 2.7 | 2.7 | 2.8 | 3.6 | 3.5 |

EXAMPLE 10

4.43 g (8.0 mmol) of 1,3-diamino-5-(perfluorononenyloxy)benzene [having the structural formula (A)] and 16 g of N-methyl-2-pyrrolidone were supplied into and stirred in a four-necked flask equipped with a thermometer, a stirrer and a drying pipe. After 1,3-diamino-5-(perfluorononenyloxy)benzene was dissolved, 2.58 g (8.0 mmol) of 3,4,3',4'-benzophenonetetracarboxylic acid dianhydride was added gradually to the solution while passing nitrogen therethrough at room temperature, allowing the materials to react at room temperature for about 2 hours. Then, 0.62 g (0.2 mmol) of 3,3',5,5'-tetraethyl-4,4'-diaminodiphenylmethane was added at room temperature, followed by further addition of 0.072 g (0.133 mmol) of 1,1,1-tris(-methyl trimellitate)propane trianhydride, and the reaction was continued at room temperature for about one hour to obtain a polyimide resin precursor.

COMPARATIVE EXAMPLE 3

3.34 g (10.0 mmol) of 2,2-bis(4-aminophenyl)hexafluoropropane and 16 g of N,N-dimethylacetamide were supplied into and stirred in a four-necked flask equipped with a thermometer, a stirrer and a drying pipe. Upon dissolution of 2,2-bis(4-aminophenyl)hexafluoropropane, 4.44 g (10.0 mmol) of 2,2-bis(3,4-dicarboxyphenyl)hexafluoropropane was added gradually while cooling the flask in an ice bath, and the mixture was reacted under ice-bath cooling for 5 hours to obtain a polyimide resin precursor.

Each of the polyimide resin precursors obtained in Example 10 and Comparative Example 3 was spin coated on a glass substrate and heated at 150° C., 200° C., 250° C. and 300° C. successively for 30 minutes at each temperature to obtain a polyimide resin coating film. By using the obtained polyimide resin coating films, solvent resistance, glass transition temperature and elastic modulus in tension were determined. The

TABLE 2

| | Example 10 | Comp. Example 3 |
|---|---|---|
| Solvent resistance | | |
| Acetone | ○ | Roughed |
| Trichloroethylene | ○ | " |
| Dimethylacetamide | ○ | Dissolved |
| Isopropyl alcohol | ○ | ○ |
| Methyl ethyl ketone | ○ | Roughed |
| Glass transition temperature (°C.) | 263 | 260 |
| Water absorptivity of polyimide (%) | 0.2 | 0.3 |
| Reduced viscosity of polyamide-acid (dl/g) | 0.17 | 0.27 |
| Fluorine atom content in polyamide (wt %) | 31.7 | 30.7 |
| Dielectric constant of polyimide | 2.7 | 3.1 |

The fluorine-containing polyimides and polyamide-acids of the formulae (I), (I)+(I'), (II), (II)+(II') of this invention are novel. These polyimides and those obtained from said polyamide-acids are low in dielectric constant and water absorptivity and excellent in heat and moisture resistance.

Said polyimides and the precursors thereof can be easily produced according to the methods described and claimed in the present invention. The compounds represented by the formula (III) are the novel diamines for producing said polyimides and precursors thereof. The compounds represented by the formula (IV) are the novel intermediates for the preparation of said diamines. These compounds can be easily produced according to the methods mentioned above.

What is claimed is:

1. A fluorine-containing polyimide having repeating units represented by the formula:

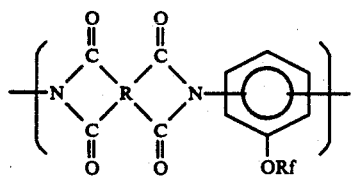
(I)

wherein R represents a tetravalent radical derived from a tetracarboxylic acid dianhydride; Rf represents —$C_nF_{2n-1}$ wherein n is an integer of 6 to 12, which contains one double bond and may be branched; and one or more hydrogens in the benzene ring may be substituted with one or more substituents.

2. A fluorine-containing polyimide according to claim 1, wherein the polyimide has the repeating units represented by the formula (I) and the repeating units represented by the formula:

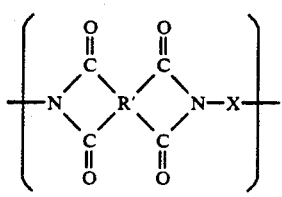
(I')

wherein R' represents a tetravalent radical derived from a tetracarboxylic acid dianhydride; and X represents a divalent reside of a diamine exclusive of the groups represented by

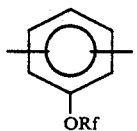

wherein one or more hydrogens in the benzene ring may be optionally substituted with one or more substituents selected from a lower alkyl group, a lower alkoxyl group, fluorine, chlorine, and bromine.

3. A fluorine-containing polyimide according to claim 2, wherein the repeating units represented by the formula (I) are contained in an amount of 100 to 5 mol % and the repeating units represented by the formula (I') are contained in an amount of 0 to 95 mol %.

4. A fluorine-containing polyimide according to claim 1, wherein Rf in the formula (I) is a branched group.

5. A fluorine-containing polyimide according to claim 1, wherein Rf in the formula (I) is a group represented by the formula:

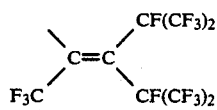
(A)

6. A fluorine-containing polyamide-acid having repeating units represented by the formula:

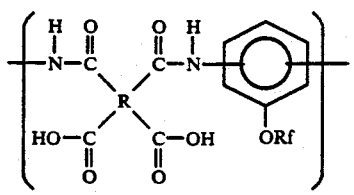
(II)

wherein R represents a tetravalent radical derived from a tetracarboxylic acid dianhydride; Rf represents —$C_nF_{2n-1}$ wherein n is an integer of 6 to 12, which contains one double bond and may be branched appropriately; and one or more hydrogens in the benzene ring may be substituted with one or more substituents.

7. A process for producing a fluorine-containing polyimide or a precursor thereof, which comprises reacting (a) an acid anhydride component containing at least one tetracarboxylic acid dianhydride and a hexacarboxylic acid trianhydride and (b) a diamine component containing a fluorine-containing aromatic diamine compound represented by the formula (III):

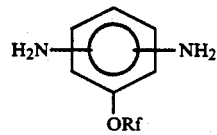
(III)

wherein Rf represents —$C_nF_{2n-1}$ wherein n is an integer of 6 to 12, which contains one double bond and may be branched properly; one or more hydrogens in the benzene may be substituted with one or more substituents, and two amino groups are bonded to the aromatic ring at the ortho-, meta- or para-position in relation to the ether linkage.

8. A process according to claim 7, wherein said diamine component comprises 5 to 100 mol % of a fluorine-containing aromatic diamine compound of the formula (III) and 95 to 0 mol % of at least one diamine compound other than those of formula (III).

9. A process according to claim 7, wherein an acid anhydride component comprising 65 to 97 mol % of a tetracarboxylic acid dianhydride and 35 to 3 mol % of a hexacarboxylic acid trianhydride represented by the following formula (VIII):

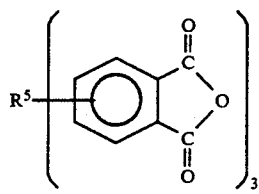
(VIII)

or the following formula (IX):

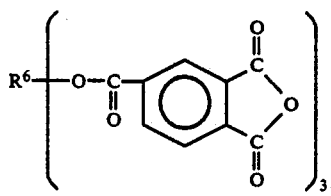

(IX)

wherein R⁵ or R⁶ is a trivalent organic group, is reacted with a diamine component comprising 5 to 95.5 mol % of a fluorine-containing diamine compound of the formula (III) and 0.5 to 95 mol % of an aromatic diamine of the formula (X):

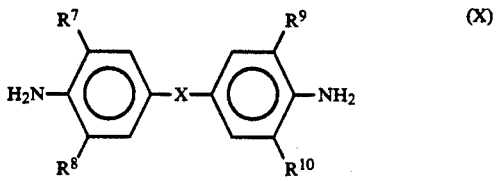

(X)

wherein $R^7$, $R^8$, $R^9$ and $R^{10}$ represent independently hydrogen, an alkyl group, a fluorine-substituted alkyl group, an alkoxyl group, or a halogen with at least one of $R^7$, $R^8$, $R^9$ and $R^{10}$ being a group other hydrogen, and X represents —CH—, C(CH₃)₂—, —C(CF₃)₂—, —O—, —C(=C)—, SO₂— or —S— or linkage.

10. A process according to claim 7, wherein the fluorine-containing aromatic compound of the formula (III) is the one in which Rf in the formula (III) is branched.

11. A process according to claim 7, wherein the fluorine-containing aromatic diamine compound of the formula (III) is the one represented by the formula:

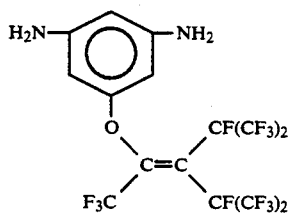

(a)

12. A fluorine-containing polyimide according to claim 1, wherein the tetravalent radical derived from a tetracarboxylic acid dianhydride contains from 2 to 27 carbon atoms.

13. A fluorine-containing polyimide according to claim 2, wherein the tetravalent radical of a tetracarboxylic acid anhydride contains from 2 to 27 carbon atoms.

14. A fluorine-containing polyimide according to claim 6, wherein the tetravalent radical derived from a tetracarboxylic acid dianhydride contains from 2 to 27 carbon atoms.

15. A process according to claim 7, wherein the acid anhydride component and the diamine component are reacted at an appropriate temperature ranging from below 80° C. to above 100° C. in the presence of an organic solvent and an imidization catalyst.

16. A fluorine-containing polyimide according to claim 1, wherein R is a tetravalent radical obtained by removing the dianhydride groups and derived from tetracarboxylic acid dianhydrides consisting of pyromellitic acid dianhydride,
3,3',4,4'-diphenyltetracarboxylic acid dianhydride,
bis(3,4-dicarboxyphenyl)sulfone dianhydride,
3,4,9,10-perillenetetracarboxylic acid dianhydride,
bis(3,4-dicarboxyphenyl)ether dianhydride,
benzene-1,2,3,4-tetracarboxylic acid dianhydride,
3,4,3',4'-benzophenonetetracarboxylic acid dianhydride,
3,4,3',4'-diphenyltetracarboxylic acid dianhydride,
ethyleneglycolbis(trimellitic acid dianhydride),
1,2,3,4-butanetetracarboxylic acid dianhydride,
cyclopentane-1,2,3,4-tetracarboxylic acid dianhydride,
1,2,3,4-cyclobutanetetracarboxylic acid dianhydride,
bis{exo-bicyclo(2,2,1)heptane-2,3-dicarboxylic acid anhydride}sulfone,
2,2-bis(3,4-dicarboxyphenyl)hexafluoropropane dianhydride, and
2,2-bis{4-(3,4-dicarboxyphenoxy)phenyl}-hexafluoropropane dianhydride.

17. A fluorine-containing polyimide according to claim 2, wherein R' is a tetravalent radical obtained by removing the dianhydride groups and derived from tetracarboxylic acid dianhydrides consisting of pyromellitic acid dianhydride,
3,3',4,4'-diphenyltetracarboxylic acid dianhydride,
bis(3,4-dicarboxyphenyl)sulfone dianhydride,
3,4,9,10-perillenetetracarboxylic acid dianhydride,
bis(3,4-dicarboxyphenyl)ether dianhydride,
benzene-1,2,3,4-tetracarboxylic acid dianhydride,
3,4,3',4'-benzophenonetetracarboxylic acid dianhydride,
3,4,3',4'-diphenyltetracarboxylic acid dianhydride,
ethyleneglycolbis(trimellitic acid dianhydride),
1,2,3,4-butanetetracarboxylic acid dianhydride,
cyclopentane-1,2,3,4-tetracarboxylic acid dianhydride,
1,2,3,4-cyclobutanetetracarboxylic acid dianhydride,
bis{exo-bicyclo(2,2,1)heptane-2,3-dicarboxylic acid anhydride}sulfone,
2,2-bis(3,4-dicarboxyphenyl)hexafluoropropane dianhydride, and
2,2-bis{4-(3,4-dicarboxyphenoxy)phenyl}-hexafluoropropane dianhydride.

18. A fluorine-containing polyimide according to claim 6, wherein R is a tetravalent radical obtained by removing the dianhydride groups and derived from tetracarboxylic acid dianhydrides consisting of pyromellitic acid dianhydride,
3,3',4,4'-diphenyltetracarboxylic acid dianhydride,
bis(3,4-dicarboxyphenyl)sulfone dianhydride,
3,4,9,10-perillenetetracarboxylic acid dianhydride,
bis(3,4-dicarboxyphenyl)ether dianhydride,
benzene-1,2,3,4-tetracarboxylic acid dianhydride,
3,4,3',4'-benzophenonetetracarboxylic acid dianhydride,
3,4,3',4'-diphenyltetracarboxylic acid dianhydride,
ethyleneglycolbis(trimellitic acid dianhydride),
1,2,3,4-butanetetracarboxylic acid dianhydride,
cyclopentane-1,2,3,4-tetracarboxylic acid dianhydride,
1,2,3,4-cyclobutanetetracarboxylic acid dianhydride,
bis{exo-bicyclo(2,2,1)heptane-2,3-dicarboxylic acid anhydride}sulfone,
2,2-bis(3,4-dicarboxyphenyl)hexafluoropropane dianhydride, and
2,2-bis{4-(3,4-dicarboxyphenoxy)phenyl}-hexafluoropropane dianhydride.

19. A process according to claim 7, wherein the acid anhydride component (a) is at least one member selected from the group consisting of pyromellitic acid dianhydride,
3,3',4,4'-diphenyltetracarboxylic acid dianhydride,
bis(3,4-dicarboxyphenyl)sulfone dianhydride,
3,4,9,10-perillenetetracarboxylic acid dianhydride,
bis(3,4-dicarboxyphenyl)ether dianhydride,
benzene-1,2,3,4-tetracarboxylic acid dianhydride,
3,4,3',4'-benzophenonetetracarboxylic acid dianhydride,
3,4,3',4'-diphenyltetracarboxylic acid dianhydride,
ethyleneglycolbis(trimellitic acid dianhydride),
1,2,3,4-butanetetracarboxylic acid dianhydride,
cyclopentane-1,2,3,4-tetracarboxylic acid dianhydride,
1,2,3,4-cyclobutanetetracarboxylic acid dianhydride,
bis{exo-bicyclo(2,2,1)heptane-2,3-dicarboxylic acid anhydride}sulfone,
2,2-bis(3,4-dicarboxyphenyl)hexafluoropropane dianhydride, and
2,2-bis{4-(3,4-dicarboxyphenoxy)phenyl}-hexafluoropropane dianhydride.

20. A process according to claim 8, wherein the diamine compounds other than those of the formula (III) are at least one member selected from the group consisting of
p-phenylenediamine,
m-phenylenediamine,
4,4'-diaminodiphenylpropane,
4,4'-diaminodiphenylmethane,
3,3'-diaminobenzophenone,
4,4'-diaminodiphenyl sulfide,
4,4'-diaminodiphenylsulfone,
4,4'-diaminodiphenyl ether,
decamethylenediamine,
1,4-diaminocyclohexane,
2,2-bis(4-aminophenyl)hexafluoropropane, and
2,2-bis{4-(4-aminophenoxy)phenyl}hexafluoropropane.

* * * * *